United States Patent
Nagasawa et al.

(10) Patent No.: US 9,868,466 B2
(45) Date of Patent: Jan. 16, 2018

(54) VEHICLE BODY STRUCTURE

(71) Applicant: Fuji Jukogyo Kabushiki Kaisha, Tokyo (JP)

(72) Inventors: Isamu Nagasawa, Tokyo (JP); Takeshi Abe, Tokyo (JP); Takatomo Watamori, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 14/218,510

(22) Filed: Mar. 18, 2014

(65) Prior Publication Data

US 2014/0291053 A1    Oct. 2, 2014

(30) Foreign Application Priority Data

Mar. 26, 2013  (JP) ................. 2013-063929
Mar. 26, 2013  (JP) ................. 2013-063930
Mar. 29, 2013  (JP) ................. 2013-071545
Mar. 29, 2013  (JP) ................. 2013-071546

(51) Int. Cl.
   *B62D 21/15*   (2006.01)
   *B62D 25/08*   (2006.01)

(52) U.S. Cl.
   CPC ......... *B62D 21/152* (2013.01); *B62D 25/082* (2013.01); *B62D 25/084* (2013.01); *B62D 25/085* (2013.01); *B62D 25/088* (2013.01)

(58) Field of Classification Search
   CPC .... B62D 21/152; B62D 25/08; B62D 25/082; B62D 25/088; B62D 25/084; B62D 25/085

USPC ....................... 180/271; 296/187.1
See application file for complete search history.

(56) References Cited

U.S. PATENT DOCUMENTS

| | | | | |
|---|---|---|---|---|
| 2,636,774 A | * | 4/1953 | Lindsay | 296/204 |
| 5,346,276 A | * | 9/1994 | Enning et al. | 296/203.02 |
| 6,390,437 B1 | * | 5/2002 | Hong | 248/559 |
| 6,773,057 B2 | * | 8/2004 | Nomura | 296/198 |
| 6,957,846 B2 | * | 10/2005 | Saeki | 296/187.1 |
| 7,540,360 B2 | * | 6/2009 | Seki | B60T 1/062 188/18 A |
| 7,882,923 B2 | * | 2/2011 | Yamamoto | B62J 99/00 180/282 |

(Continued)

FOREIGN PATENT DOCUMENTS

| | | |
|---|---|---|
| JP | S64-032986 | 2/1989 |
| JP | H03-032986 | 2/1991 |

(Continued)

OTHER PUBLICATIONS

Japanese Office Action dated Aug. 30, 2016 in Japanese Patent Application No. 2013-063929 (5 pages including machine translation).

(Continued)

*Primary Examiner* — Paul N Dickson
*Assistant Examiner* — Timothy Wilhelm
(74) *Attorney, Agent, or Firm* — Smith, Gambrell & Russell, LLP

(57) ABSTRACT

A vehicle body structure includes a main frame, an upper frame disposed in an upward direction and an outward direction of the main frame, an engine, and a reinforcing unit different from an upper suspension holder for supporting an upper suspension.

20 Claims, 25 Drawing Sheets

(56) References Cited

U.S. PATENT DOCUMENTS

| | | | |
|---|---|---|---|
| 8,596,711 B2* | 12/2013 | Yasui et al. | 296/187.09 |
| 8,876,194 B2* | 11/2014 | Dix et al. | 296/187.09 |
| 9,180,913 B2* | 11/2015 | Ameloot | B62D 21/155 |
| 2004/0056515 A1* | 3/2004 | Nomura | 296/193.09 |
| 2005/0127717 A1* | 6/2005 | Uchida | 296/203.02 |
| 2007/0108802 A1* | 5/2007 | Gunther et al. | 296/203.02 |
| 2007/0169982 A1* | 7/2007 | Ogawa et al. | 180/312 |
| 2011/0115257 A1* | 5/2011 | Kim | 296/192 |
| 2012/0187719 A1* | 7/2012 | Fujii et al. | 296/187.09 |
| 2012/0313398 A1* | 12/2012 | Shin et al. | 296/187.1 |
| 2013/0043087 A1* | 2/2013 | Mildner | B62D 25/082 |
| | | | 180/291 |

FOREIGN PATENT DOCUMENTS

| | | |
|---|---|---|
| JP | 2004-276698 | 10/2004 |
| JP | 2009-001036 | 1/2009 |
| JP | 2009-023385 | 2/2009 |
| JP | 2010-234948 | 10/2010 |
| JP | 2012-214211 | 11/2012 |

OTHER PUBLICATIONS

Japanese Office Action dated Aug. 30, 2016 in Japanese Patent Application No. 2013-063930 (5 pages including machine translation).

Japanese Office Action dated Aug. 30, 2016 in Japanese Patent Application No. 2015-071545 (4 pages including machine translation).

Japanese Office Action dated Aug. 1, 2017 in Japanese Patent Application No. 2016-210880 (5 pages including machine translation).

* cited by examiner

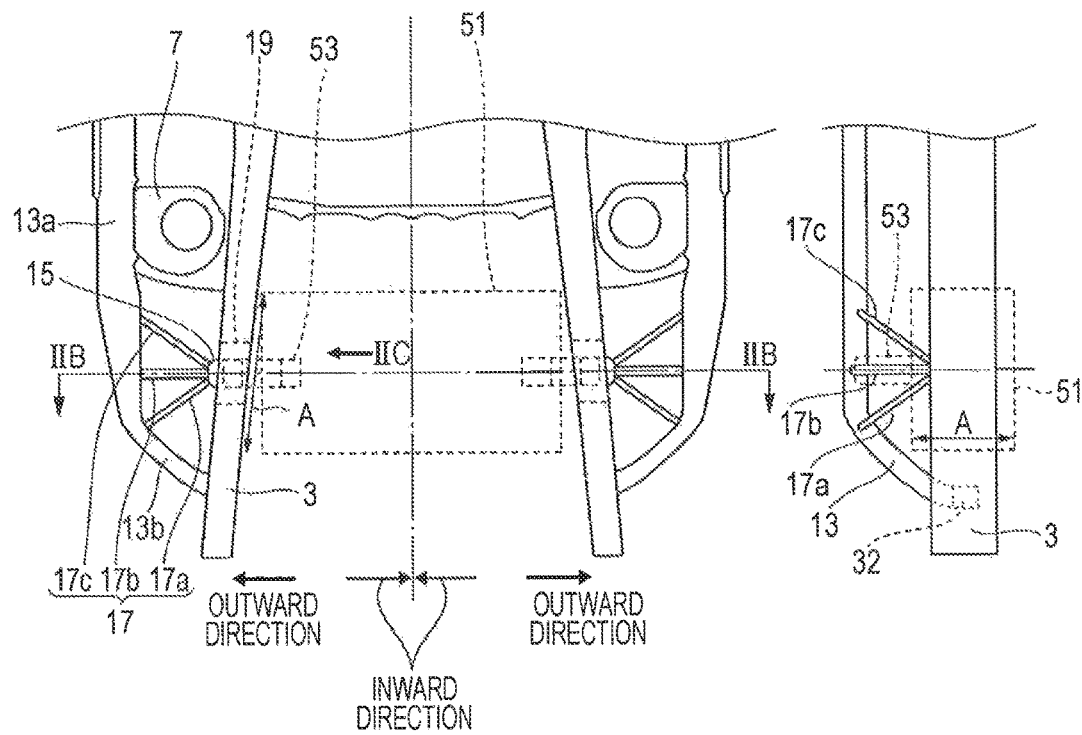
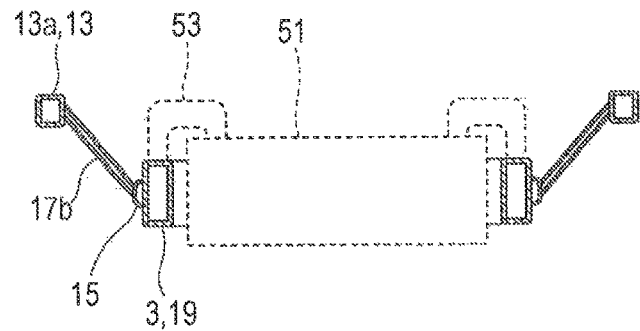

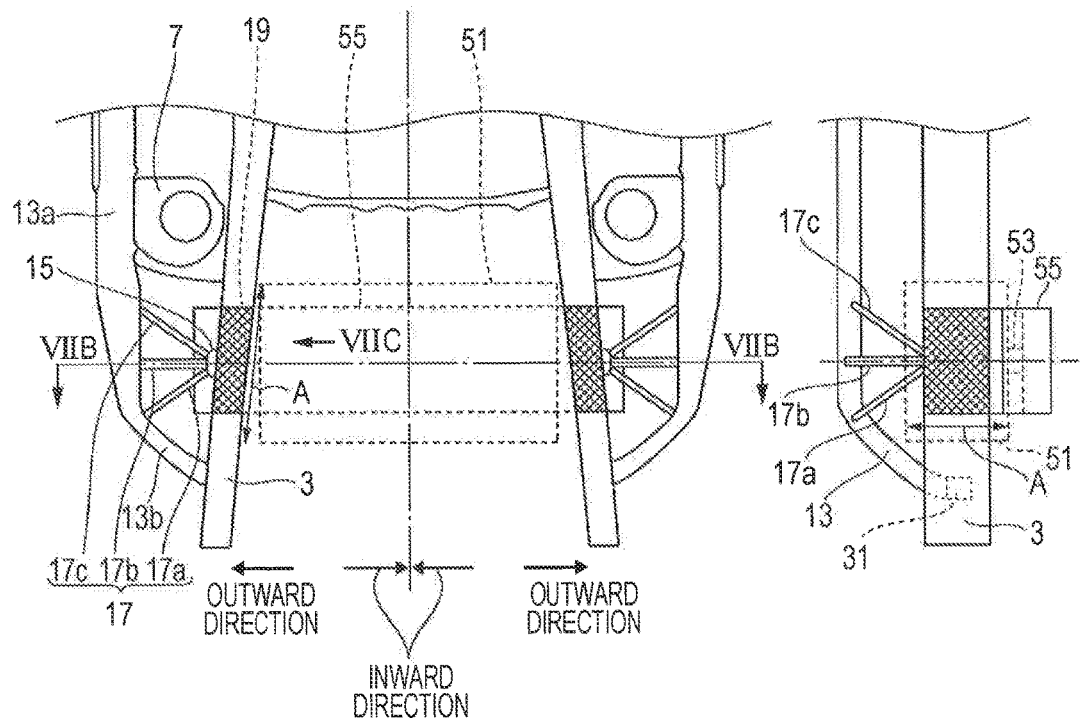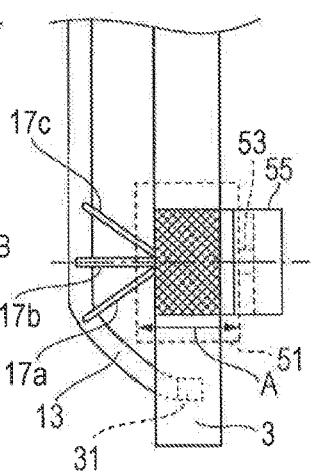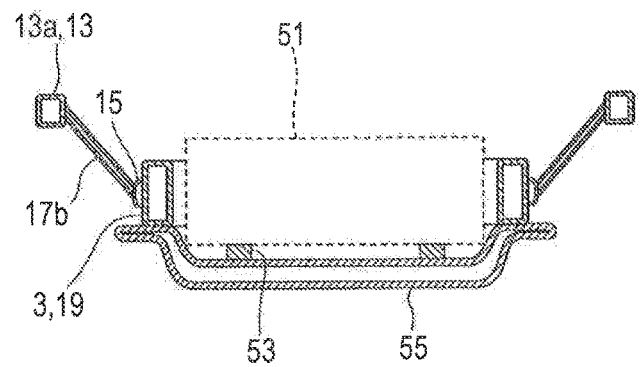

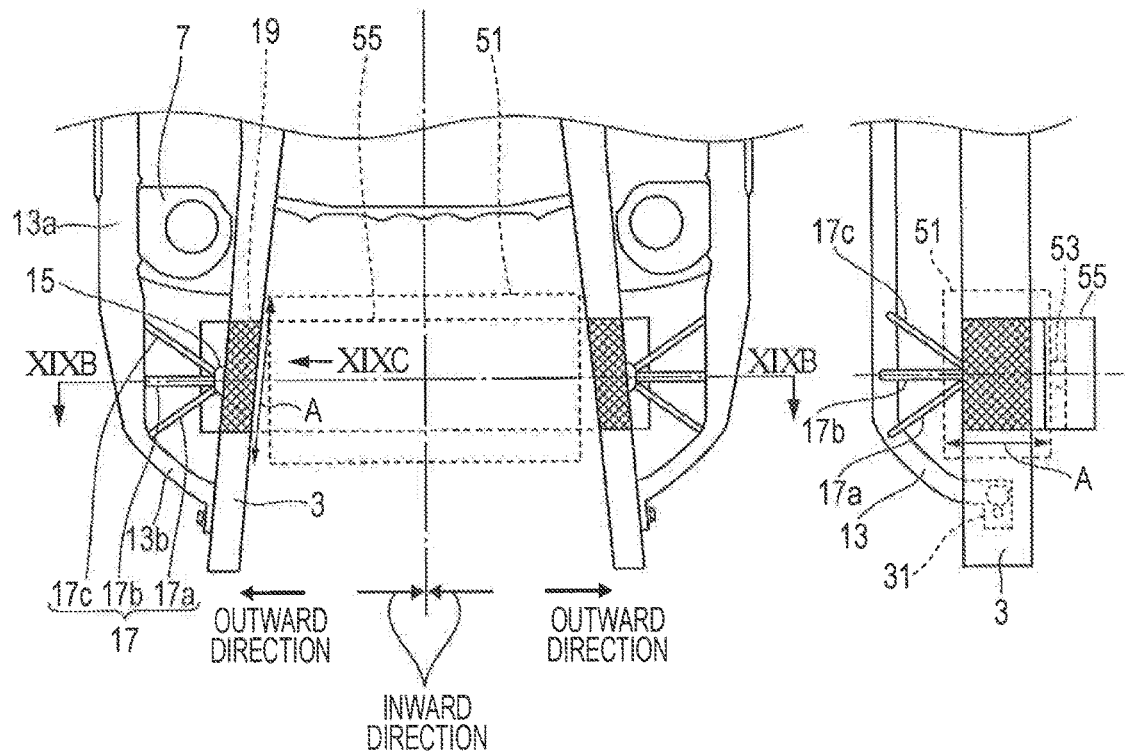
FIG. 19A
FIG. 19C
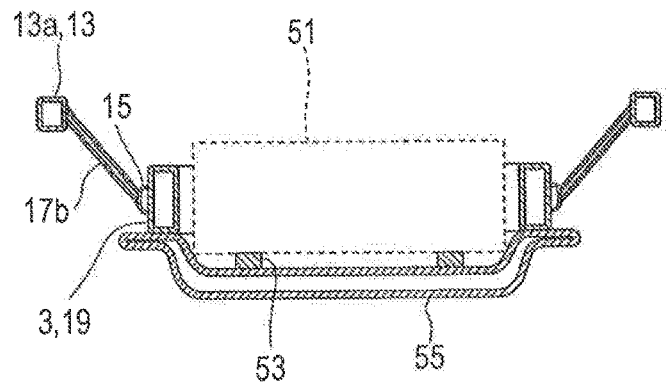
FIG. 19B

VEHICLE BODY STRUCTURE

CROSS-REFERENCES TO RELATED APPLICATIONS

The present application claims priority from Japanese Patent Application Nos. 2013-063929 filed on Mar. 26, 2013, 2013-063930 filed on Mar. 26, 2013, 2013-071545 filed on Mar. 29, 2013, and 2013-071546 filed on Mar. 29, 2013, the entire contents of which are hereby incorporated by reference.

BACKGROUND

1. Technical Field

The present invention relates to a vehicle body structure of a vehicle and more particularly relates to a front structure of a vehicle body that can enhance safety in a small overlap crash.

2. Related Art

There are cases of accidents where a vehicle crashes with an oncoming vehicle or an object installed on a road. While considering a crash with an oncoming vehicle, the following matters will be described. However, the description is not limited to this kind of crash. The same matters also apply to a crash with an object installed on the road.

Crashes are commonly categorized into three cases:

(1) a full-width front crash in which a vehicle centerline of an oncoming vehicle coincides with a vehicle centerline of the vehicle body of a vehicle of interest;

(2) a frontal offset crash in which a vehicle centerline of an oncoming vehicle does not coincide with a vehicle centerline of the vehicle body of a vehicle of interest (for example, overlap of 40%); and (3) a small overlap crash in which an oncoming vehicle crashes with a portion further toward the outside than a main frame of the vehicle body of a vehicle of interest.

In the case of a full-width front crash and a frontal offset crash out of the three types of crashes, the main frame can absorb an impact force. This is because the main frame is usually provided with an energy absorbing crush box that absorbs an impact force and because the main frame itself is designed so as to absorb the impact force.

A member for absorbing the impact force in the case of a small overlap crash is rarely provided in a vehicle. Consequently, in the case of a small overlap crash, the vehicle body absorbs the impact force and turns around an axis extending in the upward and downward directions in the vehicle body, thereby providing safety for a passenger or passengers in the vehicle.

Such a technology is disclosed in Japanese Unexamined Patent Application Publication (JP-A) No. 2012-214211.

However, in JP-A No. 2012-214211, although a reinforcing unit which interconnects an upper frame and a main frame is provided, a portion of the main frame, to which the reinforcing unit is connected, is not reinforced in comparison with the other portions of the main frame. As a result, it is necessary to reinforce the whole main frame. This causes a problem of an increase in weight.

SUMMARY OF THE INVENTION

Accordingly, it is an object of the present invention to provide a vehicle body structure which enhances safety in a small overlap crash without increasing the weight of the whole vehicle body.

A first aspect of the present invention provides a vehicle body structure including a main frame, an upper frame disposed in an upward direction and an outward direction of the main frame, an engine, and a reinforcing unit different from an upper suspension holder for supporting an upper suspension.

The vehicle body structure may include a reinforced portion having a strength which is higher than that of the other portions of the main frame. The reinforcing unit may bridge between the upper frame and the reinforced portion. A position of the reinforced portion in frontward and backward directions and upward and downward directions may be arranged within a range of a position of a side surface of the engine in an outward direction and a sideways direction.

The vehicle body structure may include a connecting portion for interconnecting the reinforced portion and the reinforcing unit, the connecting portion having an upper member disposed on the reinforced portion in an upward direction and an inner member disposed on the reinforced portion in an inward direction. The upper member and the reinforcing unit may be interconnected.

The vehicle body structure may include a connecting portion for interconnecting the reinforced portion and the reinforcing unit, the connecting portion being connected with the reinforcing unit at a position in an outward direction of the reinforced portion.

The vehicle body structure may include an engine mount for supporting the engine on the main frame. The reinforced portion may have a strength which is higher than that of the other portions of the main frame by connecting at least the engine mount with the main frame.

The reinforced portion may have a strength which is higher than that of the other portions of the main frame by providing the reinforced portion with a member for controlling an amount of energy absorption of at least the main frame.

The reinforced portion may have a strength which is higher than that of the other portions of the main frame by connecting at least a battery holder which supports a battery to the main frame.

The vehicle body structure may further include a suspension cross member connected with the main frame and supporting the engine. The main frame may include a reinforced portion having a strength which is higher than that of the other portions of the main frame at least by connecting the suspension cross member with the main frame. The reinforcing unit may bridge between the upper frame and the reinforced portion.

The position of the reinforced portion in frontward and backward directions and upward and downward directions may be arranged in an area of an outward side surface of the engine in an outward direction.

The vehicle body structure may include a connecting unit for interconnecting the reinforced portion and the reinforcing unit, the connecting unit having an upper member disposed on the reinforced portion in an upward direction and an inner member disposed on the reinforced portion in an inward direction. The upper member and the reinforcing unit may be interconnected.

The vehicle body structure may include a connecting unit for interconnecting the reinforced portion and the reinforcing unit, the connecting unit being connected with the reinforcing unit at a position in an outward direction of the reinforced portion.

The position of the reinforced portion in the frontward and backward directions and the upward and downward directions may be outside the area on the outward side surface of the engine in the outward direction.

The vehicle body structure may further include a suspension cross member for supporting the engine and a main frame bracket unit connected with the main frame for interconnecting the main frame and the suspension cross member. The reinforcing unit may bridge between the upper frame and the main frame bracket unit.

The position of the reinforced portion in the frontward and backward directions and the upward and downward directions may be within the area on the outward side surface of the engine in the outward direction.

The main frame bracket unit may have an upper member disposed on the main frame in the upward direction and an inner member disposed on the main frame in the inward direction. The upper member and the reinforcing unit may be interconnected.

The main frame bracket unit may be connected with the reinforcing unit at a position of the reinforced portion in the outward direction.

The vehicle body structure may include the reinforced portion. The position of the reinforced portion at the frontward and backward directions and the upward and downward directions may be arranged in an area other than the area on the outward side surface of the engine in the outward direction.

The reinforcing unit may bridge between the upper frame and the main frame.

The reinforcing unit may have at least a front reinforcing unit disposed in the frontward direction and a rear reinforcing unit disposed in a backward direction.

The front reinforcing unit and the rear reinforcing unit may be connected with the main frame at the same position on the main frame.

The front reinforcing unit and the rear reinforcing unit may extend in different directions.

The reinforcing unit may be connected with the upper frame at a position in the backward direction from a position divided by one-half of a distance between a position of a distal end of the main frame in the frontward direction and a position on a frontward side surface of the engine.

Another aspect of the present invention provides a vehicle body structure including a main frame, an upper frame disposed in an upward direction and an outward direction with respect to the main frame, an engine, an upper suspension holder for supporting an upper suspension, and a reinforcing unit different from the upper suspension holder. The reinforcing unit interconnects the upper frame and the upper suspension holder. A position at which the upper suspension holder is connected with the upper suspension in frontward and backward directions and upward and downward directions is arranged within a range of a position of a side surface of the engine in the outward direction and a sideways direction.

The vehicle body structure may further include a reinforced portion for reinforcing the upper suspension holder. The reinforcing unit may bridge between the upper frame and the reinforced portion. A position of the reinforced portion in the frontward and the backward directions and the upward and downward directions may be arranged within a range of a position of the side surface of the engine in the outward direction and the sideways direction.

The vehicle body structure may include a connecting portion for interconnecting the upper suspension or the reinforced portion and the reinforcing unit, the connecting portion having an upper member disposed on the reinforced portion in the upward direction and an inner member disposed on the reinforced portion in the inward direction. The upper member and the reinforcing unit may be interconnected.

The vehicle body structure may include a connecting portion for interconnecting the upper suspension or the reinforced portion and the reinforcing unit, the connecting portion being connected with the reinforcing unit at a position in an outward direction of the reinforced portion.

Another aspect of the present invention provides a vehicle body structure including a main frame, and an upper frame disposed in an upward direction and an outward direction with respect to the main frame. The upper frame is curved in an inward direction and a downward direction at a frontward side from a given position. A distal end of the upper frame in a frontward direction is connected with the main frame. The upper frame and the main frame is connected at a position between a distal end of a vehicle body and a radiator panel. The upper frame and the main frame is connected such that the upper frame and the main frame can pivot at a crash in relation to each other about an axle extending in the inward and outward directions.

The upper frame and the main frame may be are interconnected at a side position in an inward or outward direction of the main frame.

The connecting portion may be connected through a flange. The connecting portion may be provided with a plurality of holes around the flange, the holes each having a keyhole shape. An axis of each of the keyhole slots in a longitudinal direction may be perpendicular to an axis on which the upper frame and the main frame pivots with respect to each other and is spaced from the pivotal axis by an equal distance.

The length of the upper frame a length in the upward and downward directions may become smaller as the upper frame approaches the main frame.

Another aspect of the present invention provides a vehicle body structure in a fourth aspect of the invention including a main frame and an upper frame disposed in an upward direction and an outward direction with respect to the main frame. The upper frame is curved in an inward direction and a downward direction at a frontward side from a given position. A distal end of the upper frame in a frontward direction is connected with the main frame. The upper frame and the main frame connected at a position between of a distal end of a vehicle body and a radiator panel. The upper frame and the main frame connected at a side position on an upward side surface of the main frame.

BRIEF DESCRIPTION OF THE DRAWINGS

FIG. 2A is a plan view of a part of the vehicle body structure, illustrating a first implementation of the invention;

FIG. 2B is a cross sectional view taken along a line IIB-IIB in FIG. 2A;

FIG. 2C is a side elevation view looked from an arrow IIC in FIG. 2A;

FIG. 7A is a plan view of a part of the vehicle body structure, illustrating a fourth implementation of the invention;

FIG. 7B is a cross sectional view taken along a line VIIB-VIIB in FIG. 7A;

FIG. 7C is a side elevation view looked from an arrow VIIC in FIG. 7A;

FIG. 19A is a plan view of a part of the vehicle body structure, illustrating an eleventh implementation of the invention;

FIG. 19B is a cross sectional view taken along a line XIXB-XIXB in FIG. 19A;

FIG. 19C is a side elevation view looked from an arrow XIXC in FIG. 19A;

DETAILED DESCRIPTION

By referring now to FIG. 1 through FIG. 4, a first implementation of a vehicle body structure according to the invention will be described below.

Figure 1:
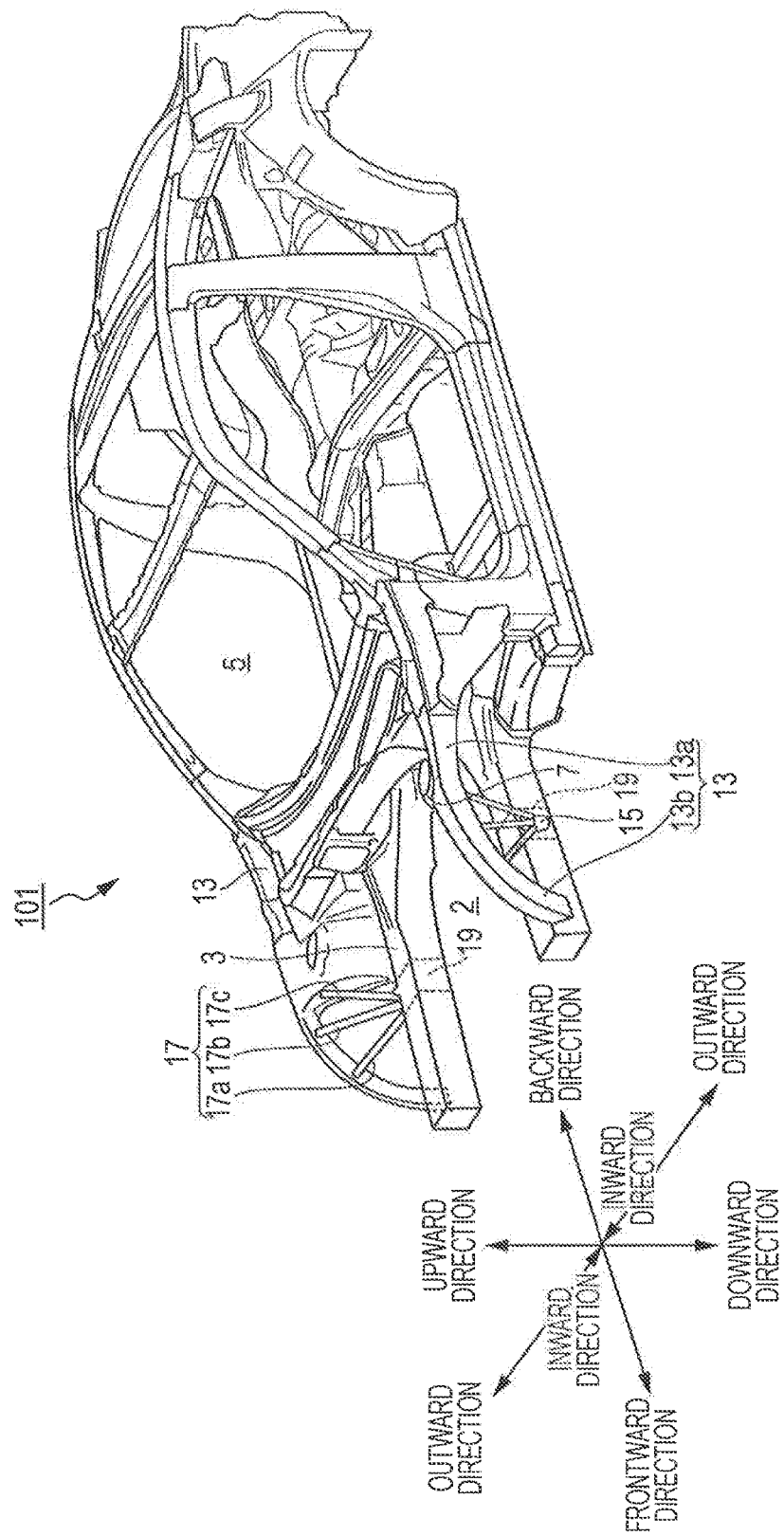
FIG. 1 is a schematically explanatory view of a vehicle body structure of a vehicle.

FIG. 1 is a schematically explanatory view of a vehicle body structure of a vehicle according to the implementation.

As illustrated in FIG. 1, a vehicle 101 includes a vehicle cabin space 5 which can accommodate a passenger or passengers, and a front vehicle space 2 which can contain an engine, batteries, or the like.

The front vehicle space 2 may be any space in a frontward direction from the vehicle cabin space 5. The front vehicle space 2 need not contain the engine and the batteries unless otherwise specified. For example, the front vehicle space may be used as a trunk.

Directions in the vehicle will be defined as follows. A forward direction is defined as a direction in which the vehicle 101 travels under normal conditions, that is, a direction toward to the left side in FIG. 1 in the case where a driver sits on a driver's seat and the driver faces not sideward but forward. A backward direction is defined as a direction opposite to the forward direction, that is, a direction toward the right side in FIG. 1.

An upward direction is defined as an upward direction in the case where the vehicle 101 is traveling, that is, a direction toward the upper side in FIG. 1 in the case where a driver sits on a driver's seat and the top part of the driver's head faces upward. A downward direction is defined as a direction opposite to the upward direction, that is, a direction toward the lower side in FIG. 1.

The vehicle 101 is symmetrical with respect to a plane that includes a first straight line which passes the longitudinal center of a vehicle body and extends in the forward direction and the backward direction and a second straight line which intersects the first straight line and extends in the upward and downward directions. Hereinafter, the plane is referred to as a "symmetry plane". An inward direction is defined as a direction toward the symmetry plane. An outward direction is defined as a direction opposite to the inward direction.

Since the vehicle 101 has a symmetrical shape with respect to the symmetry plane, a description concerning the elements on one side of the symmetry plane also serves as a description of elements on the other side of the symmetry plane and the description concerning the other side of the symmetry plane is omitted below, unless otherwise specified.

A main frame 3 and an upper frame 13 are disposed in the front vehicle space 2. An upper suspension holder 7 that holds an upper suspension of a front suspension may be disposed in the front vehicle space 2. In FIG. 1, the upper suspension holder 7 is illustrated as a top mount of a strut type suspension. However, the upper suspension holder 7 is not limited to this type of the suspension. For example, the type of the suspension may be an attachment that has a double wishbone type suspension and interconnects the upper frame and the vehicle body.

The upper frame 13 is disposed above the main frame 3 in the outward and upward directions. The main frame 3 extends from the vehicle cabin space 5 substantially horizontally in the forward direction. Two main frames 3 may extend in the forward direction while spreading slightly in the outward direction.

The upper frame 13 has an upper frame straight portion 13a and an upper frame curved portion 13b. The upper frame straight portion 13a extends substantially only in the frontward direction from the vehicle cabin space 5 to a certain position in the forward direction. The upper frame curved portion 13b extends in the inward and downward directions. An upper frame distal end 32 (see FIG. 2C) of the upper frame curved portion 13 is connected with an outward side surface of the main frame 3.

A reinforcing unit 17 interconnects the upper frame 13 (the upper frame straight portion 13a and the upper frame curved portion 13b) and the main frame 3. In more detail, the reinforcing unit 17 bridges between the upper frame 13 and a reinforced portion 19 of the main frame 3. The reinforced portion 19 has a strength which is higher than that of the other portions of the main frame 3.

In the first implementation, since an engine mount 53 interconnects an engine 51 and the main frame 3 and is connected with the main frame 3, the reinforced portion 19 results in high strength (see FIG. 2A and FIG. 2B). However, it is not necessary in the first implementation that the strength of the reinforced portion 19 of the main frame 3 be made higher than that of the other portions of the main frame 3 only by connecting the engine mount 53 with the main frame 3. The strength of the portion 19 may be increased by inserting another reinforcing unit into a space between the portion 19 and the main frame 3.

The reinforcing unit 17 may be formed of three reinforcing members 17a, 17b, and 17c so that the members extend radially. The first reinforcing member 17a is disposed at the most frontward position while the second and third reinforcing members 17b and 17c follow the first reinforcing member 17a one after another in the backward direction. The first, second, and third reinforcing members 17a, 17b, and 17c spread radially on the main frame 3. That is, the first reinforcing member 17a is connected with the upper frame 13 at the most forward position on the upper frame 13, the third reinforcing member 17c is connected with the upper frame 13 at the most backward position on the upper frame 13, and the second reinforcing member 17b is connected with the upper frame 13 at an intermediate position between the most frontward and backward positions.

The number of the reinforcing units 17 is not limited to three. The number may be one or more.

In more detail, the first reinforcing member 17a is connected with the upper frame curved portion 13b. The second and third reinforcing members 17b and 17c are connected with the upper frame straight portion 13a (see FIG. 2C). The second and third reinforcing members 17b and 17c may be connected through the upper suspension holder 7 to the upper frame straight portion 13a (see FIG. 1). Connection positions of the first, second and third reinforcing members 17a, 17b and 17c can be altered freely.

The reinforcing unit 17 (the first, second, and third reinforcing members 17a, 17b, and 17c) is connected with an inward side surface of the upper frame 13. However, the reinforcing unit 17 may be connected with a bottom side surface or another side surface of the upper frame 13. The reinforcing unit 17 is directly connected with the upper frame 13, as illustrated in FIG. 1, or the reinforcing unit 17 may be connected through another member to the upper frame 13.

The reinforcing unit 17 (the first, second, and third reinforcing members 17a, 17b, and 17c) is connected with the main frame 3 at substantially the same position. In more detail, the reinforcing unit 17 is connected with a connecting member 15. The connecting member 15 is disposed at a position where the reinforcing portion 19 is arranged on the main frame 3. In the first implementation, the connecting member 15 is connected with the outward side surface of the main frame 3. This position may be another position (refer to an alteration described hereinafter). However, the connecting member 15 is not essential to the first implementation and the reinforcing unit 17 may be directly connected with the main frame 3.

FIG. 2A is a plan view of a part of the vehicle body structure, illustrating a first implementation of the invention. FIG. 2B is a cross sectional view taken along a line IIB-IIB in FIG. 2A. FIG. 2C is a side elevation view looked from an arrow IIC in FIG. 2A.

As illustrated in FIG. 2B, the engine 51 is connected to and is fixed to the main frame 3 by an engine mount 53. When the engine mount 53 is connected with the main frame 3, the connected portion has a strength which is higher than that of the other portions. In the first implementation of the invention, the reinforced portion 19 is defined by a portion of the main frame 3 which has a higher strength than the other portions of the main frame 3.

In the first implementation, the reinforced portion 19 may be formed not only by providing the engine mount 53 but also by providing a connection unit that has a large thickness so as to connect a flange, a bolt, a nut, or the like to the main frame 3.

The connecting member 15 is disposed on the reinforced portion 19. A portion at which the reinforcing unit 17 is connected to the main frame 3 by the connecting member 15 coincides with a position of the outward side surface of the engine 51 (positions in the frontward, backward, upward, and downward directions). That is, the reinforced portion 19 is arranged on an area opposing the outward side surface of the engine 51 (an area A in FIG. 2A and an area A in FIG. 2C).

Next, an operational effect of the first implementation of the vehicle body structure will be described by referring to FIG. 3A and FIG. 3B.

Figure 3A:
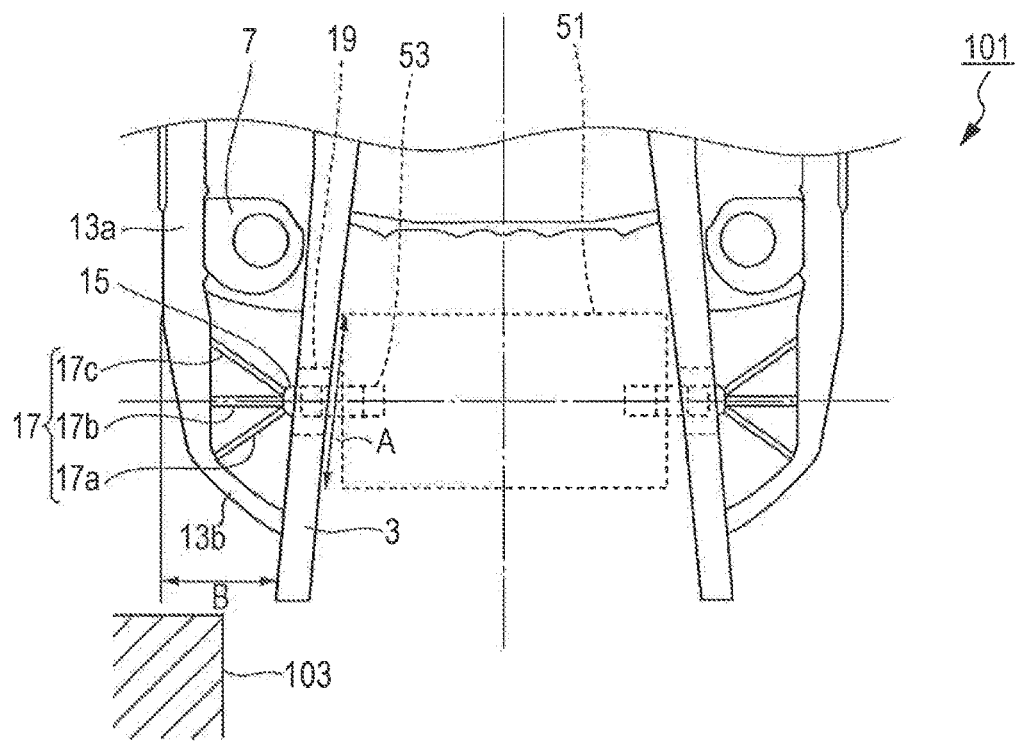
FIG. 3A is a plan view similar to FIG. 2A, illustrating a state immediately before a crash between the vehicle and an object.
Figure 3B:
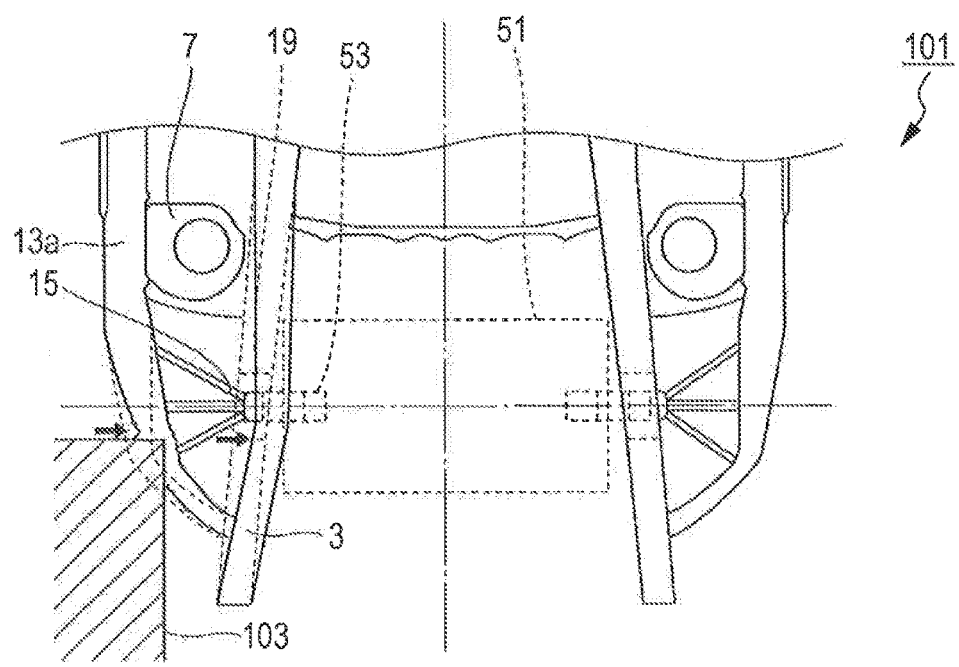
FIG. 3B is a plan view similar to FIG. 2A, illustrating a state immediately after the crash so as to demonstrate an operational effect of the vehicle body structure in the first implementation.

FIG. 3A and FIG. 3B illustrate a case where a crash between the vehicle 101 and an object 103 (an oncoming vehicle, an installed object, or the like) happens. A small overlap crash is defined as a crash in which an area further toward the outside than the main frame 3 (an area B in FIG. 3A) comes into contact with the object 103.

If no measures against such a crash are taken, there will be a problem in that the main frame 3 does not exert any absorption effect against the crash, although the main frame 3 should absorb an impact force primarily. However, in the first implementation, the reinforcing unit 17 can exert a reaction force against a small overlap crash so that the upper frame 13 (in particular, the upper frame curved portion 13b) is not deformed (see FIG. 3B). That is, since the connecting member 15 is connected with the outward side surface of the main frame 3 that has a high strength, it is possible to prevent the upper frame 13 from being deformed by a crash between the vehicle 101 and the object 103.

Furthermore, in the first implementation, since the reinforcing unit 17 is connected with the reinforced portion 19 that has a high strength in the main frame 3, it is possible for the reinforcing unit 17 to more strongly hold the upper frame 13 in comparison with the case where the reinforcing unit 17 is connected with the other portions of the main frame 3. In addition, the reinforced portion 19 is disposed in the area A at a position at the side of the engine. Thus, even if a strong crash may happen so as to deform the main frame 3 in the inward direction, the engine 51 functions as a reaction force exerting member that can prevent the main frame from being deformed. Accordingly, even if a stronger crash may happen, it is possible to more greatly prevent the main frame 3 from being deformed in comparison with a conventional vehicle body structure.

Even if a small overlap crash between the vehicle 101 and the object 103 happens, the upper frame 13 is not deformed. This will mean that any deformation does not affect the vehicle cabin space 5 in which there is a passenger or passengers. Further, the vehicle body does not affect any crash energy in a frontal offset crash onto the vehicle cabin space 5 and it is possible to convert the crash energy to rotation of the vehicle 101.

In the first implementation, the reinforcing unit 17 is connected with the outward side surface of the main frame 3. Accordingly, a force applied to the reinforcing unit 17 by the crash between the vehicle 101 and the object 103 is directly transmitted to the main frame 3. The force is naturally directed to the engine 51. This can enhance an effect of holding the upper frame 13 in the first implementation.

Furthermore, the distal end 32 (see FIG. 2C) of the upper frame 13 (the upper frame curved portion 13b) is connected with the main frame 3. Thus, the strength of the upper frame 13 itself can be increased in comparison with the conventional vehicle body structure in which the upper frame 13 is not connected with the main frame 3. According to this design, the vehicle body structure in the first implementation has a high strength against a small overlap crash. In addition, the connection between the upper frame 13 and the main frame 3 is made on the outward side surface of the main frame 3. As a result, the main frame 3 functions as a reaction force member that can prevent the upper frame 13 from being deformed in the inward direction by a crash between the upper frame 13 and the object 103. According to this design, the vehicle body structure in the first implementation has a high strength against a small overlap crash.

Furthermore, this structure has a high strength against a full-width front crash and a frontal offset crash. Since the upper frame 13 and the main frame 3 are connected with each other, it is possible for the upper frame 13 to exert a reaction force against a full-width front crash and a frontal offset crash.

It is possible to dispose the reinforcing unit 17 at any position on the upper frame 13. Accordingly, a designer can select a position where the reinforcing unit 17 exerts a reaction force against a small overlap crash (a full-width front crash and a frontal offset crash). Thus, the designer can design the vehicle 101 so as to exert the desired reaction force by selecting the position of connection between the reinforcing unit 17 and the upper frame 13.

Unless a configuration and operational effects of the first implementation are described particularly, the same matters also apply to an alteration of the first implementation and to second to fifteenth implementations and their alterations. In order to simplify the descriptions, matters that are the same will be omitted hereinafter.

Figure 4:
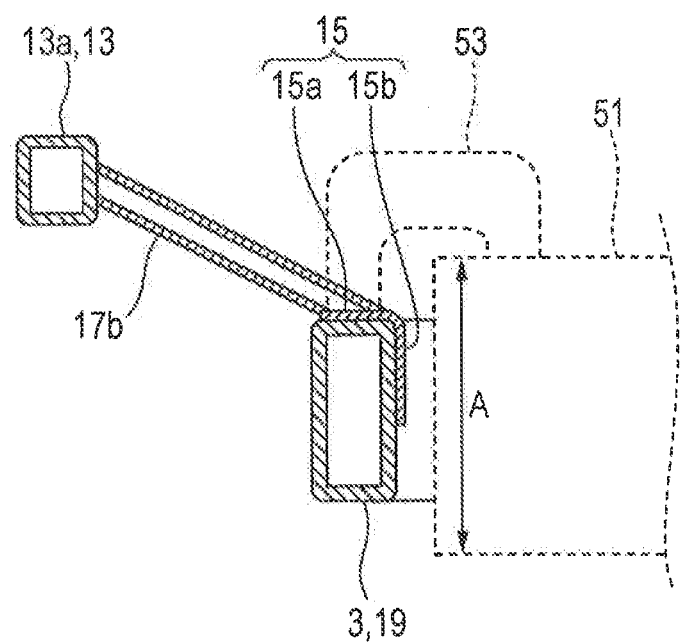
FIG. 4 is a cross sectional view similar to a part of FIG. 2B, illustrating an alteration of the first implementation.

FIG. 4 illustrates an alteration of the first implementation. In the first implementation, the connecting member 15 is disposed on the outward side surface of the main frame 3 (the reinforced portion 19). However, there may be a case where it is advantageous to connect the connecting member 15 with an upward side surface of the main frame 3. For example, there is a case where another member should be disposed on a side surface of the main frame.

In the case where the reinforcing unit 17 and the connecting member 15 are connected with the upward side surface of the main frame 3, the connecting member 15 has an upper portion 15a disposed on the upward side surface of the main frame 3 and an inner portion 15b disposed on the inward side surface of the main frame 3. The upper portion 15a is connected with the reinforcing unit 17. The inner portion 15b is arranged on the area A at a position outward from and to one side of the engine 51 (a position in the forward, backward, upward, and downward directions is arranged in the area A). Accordingly, it is possible to use the engine 51 as the reaction force exerting member, while the position of connection between the main frame 3 and the reinforcing unit 17 is kept on the upward side surface of the main frame 3.

Unless otherwise specified, this alteration of the first implementation can be applied to the other implementations. In order to simplify the descriptions, the alterations will be omitted hereinafter.

Figure 5A:
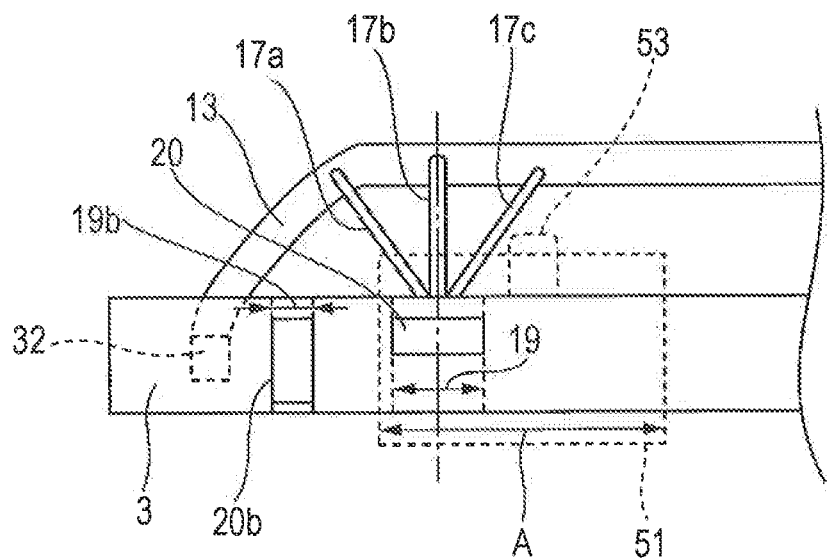
FIG. 5A is a side elevation view similar to FIG. 2C, illustrating a second implementation of the invention.
Figure 5B:
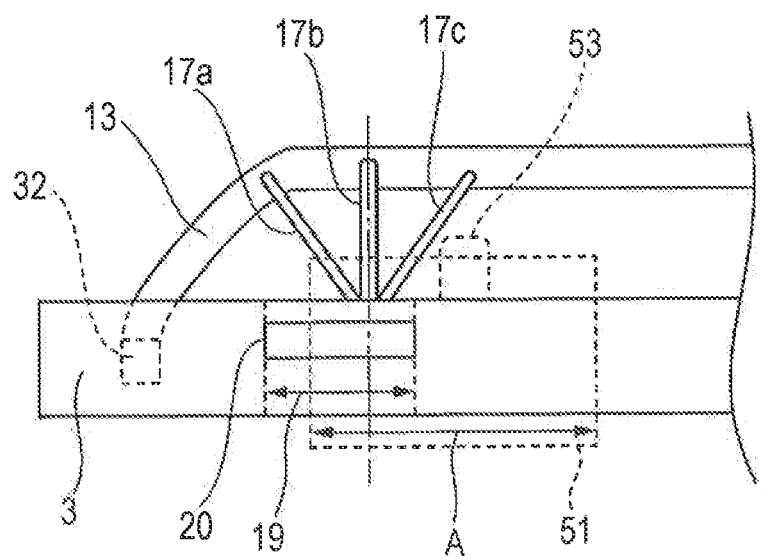
FIG. 5B is a side elevation view similar to FIG. 2C, illustrating an alteration of the second implementation.

FIG. 5A and FIG. 5B illustrate a second implementation of the invention and an alteration of the second implementation.

FIG. 5A is a side elevation view similar to FIG. 2C, illustrating a second implementation of the invention. FIG. 5B is a side elevation view similar to FIG. 2C, illustrating an alteration of the second implementation.

Since the engine mount 53 is connected with the main frame 3 in the first implementation, the reinforced portion 19 has a strength which is higher than that of the other portions of the main frame 3. In another case, since the other member is inserted between the engine mount 53 and the main frame 3 in the first implementation, the reinforced portion 19 has a strength which is higher than that of the other portions.

In the second implementation, since a strength adjustment member 20 which is different from the engine mount 53 is provided in an interior or an exterior of the main frame 3, the reinforced portion 19 has a strength which is higher than that of the other portions of the main frame 3.

As illustrated in FIG. 5A, a second strength adjustment member 20b may be provided outside the area A on the side surface of the engine 51 so as to provide a second reinforced portion 19b. The strength adjustment member 20 (the second strength adjustment member 20b) is provided so as to adjust the reaction force against the crash. It is possible for the designer to design the reaction force against the crash at the desired position on the main frame 3 by providing the strength adjustment member 20 (the second strength adjustment member 20*b*) on the main frame 3.

If necessary, the strength adjustment member 20 (the second strength adjustment member 20*b*) may be provided on the main frame 3 to achieve another object.

As illustrated in FIG. 5B, in the second implementation, all of the reinforced portion 19 may not be disposed in the area A on the side surface of the engine 51.

Figure 6A:
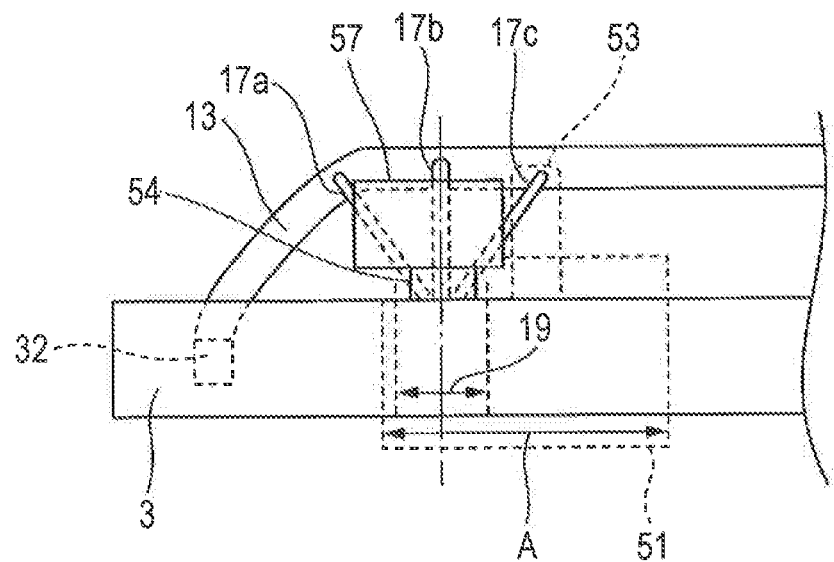
FIG. 6A is a side elevation view similar to FIG. 2C, illustrating a third implementation of the invention.
Figure 6B:
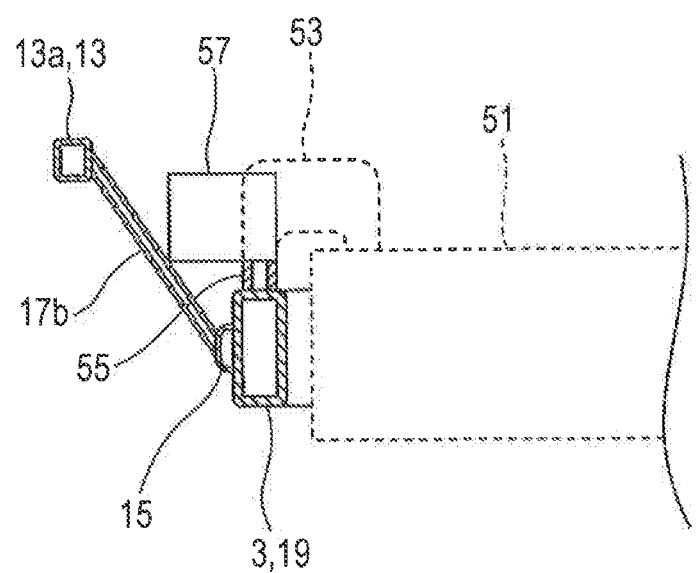
FIG. 6B is a cross sectional view similar to a part of FIG. 2B, illustrating the third implementation of the invention.

FIG. 6A is a side elevation view similar to FIG. 2C, illustrating a third implementation of the invention. FIG. 68B is a cross sectional view similar to a part of FIG. 2B, illustrating the third implementation.

Even if a battery 57 is connected through a battery mount 54 to the main frame 3, the connected portion has a strength which is higher than that of the other portions of the main frame 3. This exerts the same effect as that of the first implementation.

FIG. 7A, FIG. 7B, and FIG. 7C illustrate a fourth implementation of the invention.

FIG. 7A is a plan view of a part of the vehicle body structure, illustrating a fourth implementation of the invention. FIG. 7B is a cross sectional view taken along a line VIIB-VIIB in FIG. 7A. FIG. 7C is a side elevation view looked from an arrow VIIC in FIG. 7A.

In FIG. 1, the upper suspension holder 7 is a top mount of a strut type suspension. However, this type is not limited. For example, an attaching member between the vehicle body and the upper frame having a double wishbone type suspension may be provided.

In the fourth implementation, the reinforced portion 19 results in increasing strength of the main frame 3 by connecting a suspension cross member 55 with the main frame 3 (see FIG. 7A and FIG. 7B). However, in the fourth implementation, it is not necessary to increase strength of the portion 19 only by connecting the suspension cross member 55 with the main frame 3. A strength of the portion 19 may be increased by inserting a reinforcing unit between the main frame 3 and the portion 19.

As illustrated in FIG. 7B, the engine 51 is connected to and is fixed on the suspension cross member 55 through the engine mount 53. The suspension cross member 55 operates to hold a member which supports front tires.

Since the suspension cross member 55 is connected with the main frame 3, the connected portion has a strength which is higher than that of the other portion of the main frame 3.

In the fourth implementation of the invention, the reinforced portion 19 is defined as a portion of the main frame 3 which has a higher strength than the other portions of the main frame 3.

In the fourth implementation, the reinforced portion 19 may be designed not only by the connection of the suspension cross member 55 but also by a connection unit that has a large thickness so as to connect a flange, a bolt, a nut, or the like to the main frame.

The connecting member 15 is disposed on the reinforced portion 19. A portion at which the reinforcing unit 17 is connected to the main frame 3 by the connecting member 15 coincides with a position of the outward side surface of the engine 51 (positions in the frontward, backward, upward, and downward directions). That is, the reinforced portion 19 is arranged on an area of the outward side surface of the engine 51 (an area A in FIG. 7A and an area A in FIG. 7C).

Figure 8A:
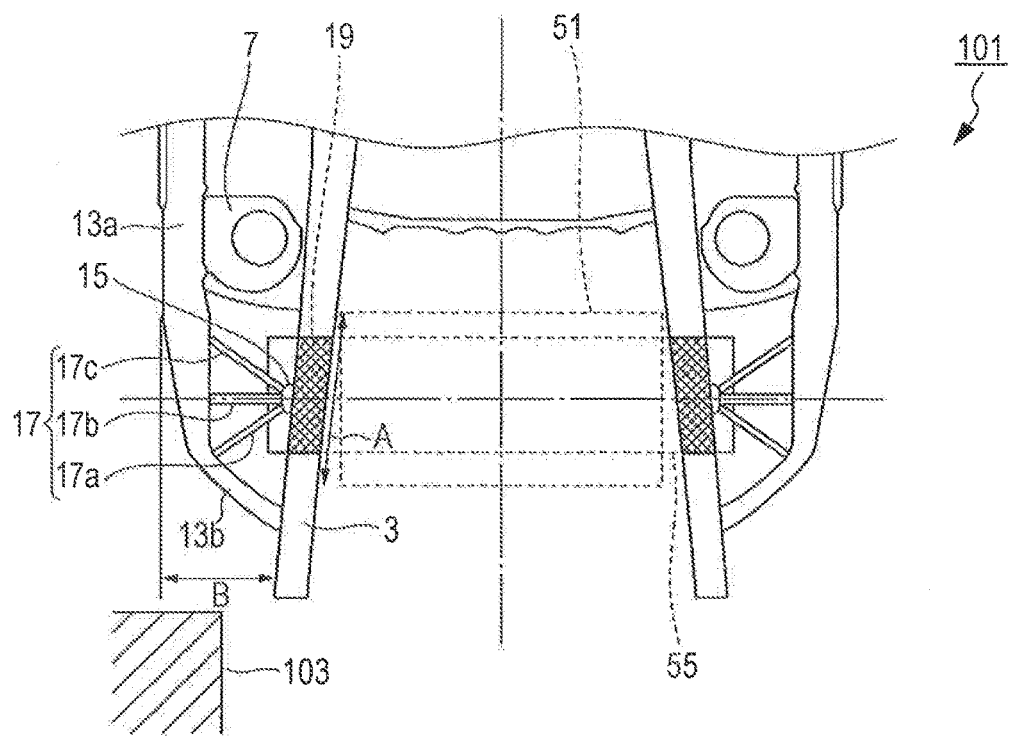
FIG. 8A is a plan view similar to FIG. 7A, illustrating a state immediately before a crash between the vehicle and the object.
Figure 8B:
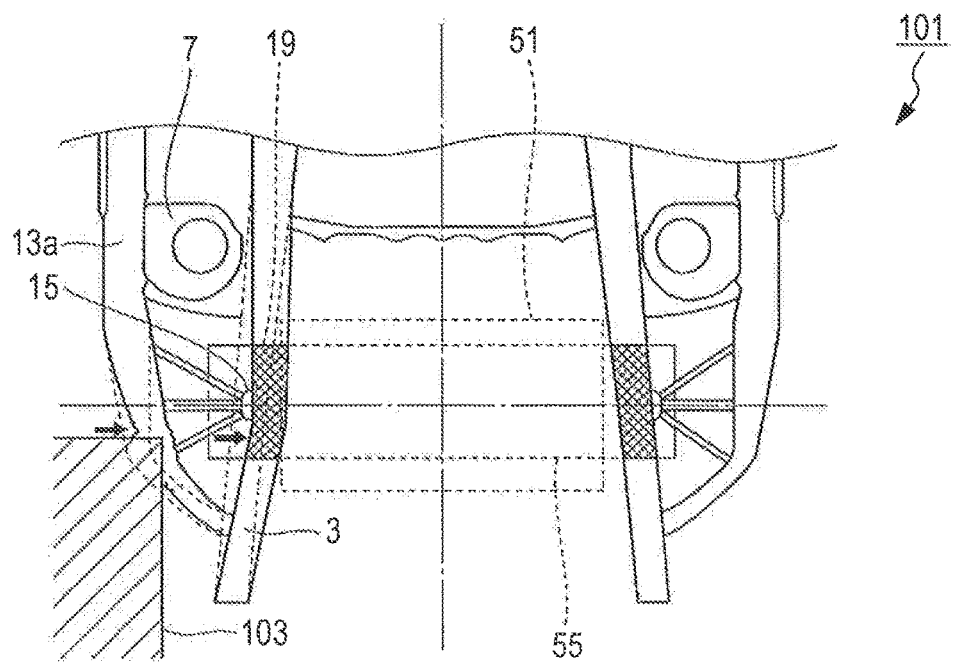
FIG. 8B is a plan view similar to FIG. 7A, illustrating a state immediately after the crash so as to demonstrate an operational effect of the vehicle body structure in the fourth implementation.

FIG. 8A and FIG. 8B illustrate an operational effect of the fourth implementation of the invention. FIG. 8A is a plan view similar to FIG. 7A, illustrating a state immediately before a crash between the vehicle 101 and the object 103. FIG. 8B is a plan view similar to FIG. 7A, illustrating a state immediately after the crash so as to demonstrate an operational effect of the vehicle body structure in the fourth implementation.

As illustrated in FIG. 8A and FIG. 8B, the fourth implementation is different from the first implementation with respect to the suspension cross member 55.

Unless a configuration and operational effects of the fourth implementation are described particularly, the same matters also apply to an alteration of the fourth implementation, the other implementations, and their alterations. In order to simplify the descriptions, matters that are same will be omitted hereinafter.

All of the reinforced portion 19 may not be disposed in the area A on the outward side surface of the engine. A part of the reinforce portion 19 may be disposed in the area A.

Figure 9:
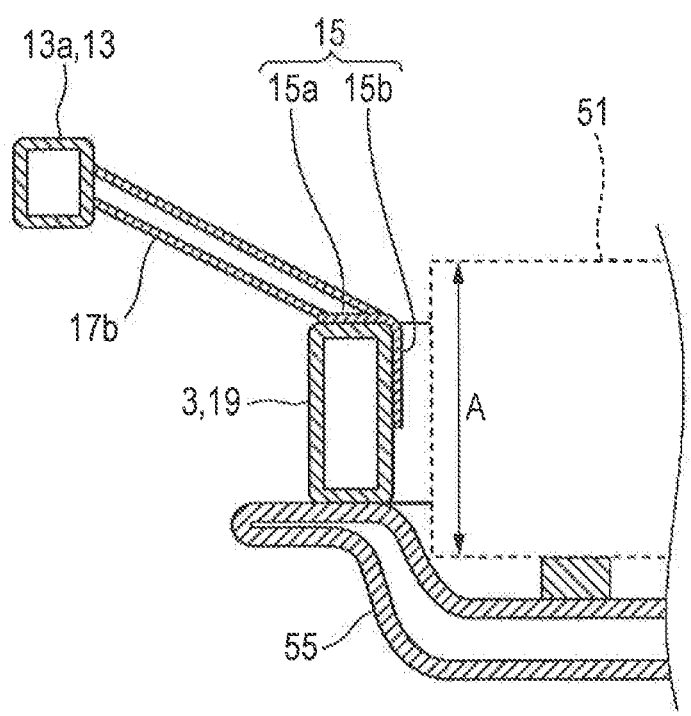
FIG. 9 is a cross sectional view similar to a part of FIG. 7B, illustrating an alteration of the fourth implementation.

FIG. 9 is a cross sectional view similar to a part of FIG. 7B, illustrating an alteration of the fourth implementation.

As illustrated in FIG. 9, the alteration of the fourth implementation is different from the first implementation with respect to the suspension cross member 55.

Unless a configuration and operational effects of the alteration of the fourth implementation are described particularly, the same matters also apply to the other implementations. In order to simplify the descriptions, matters that are same will be omitted hereinafter.

Figure 10:
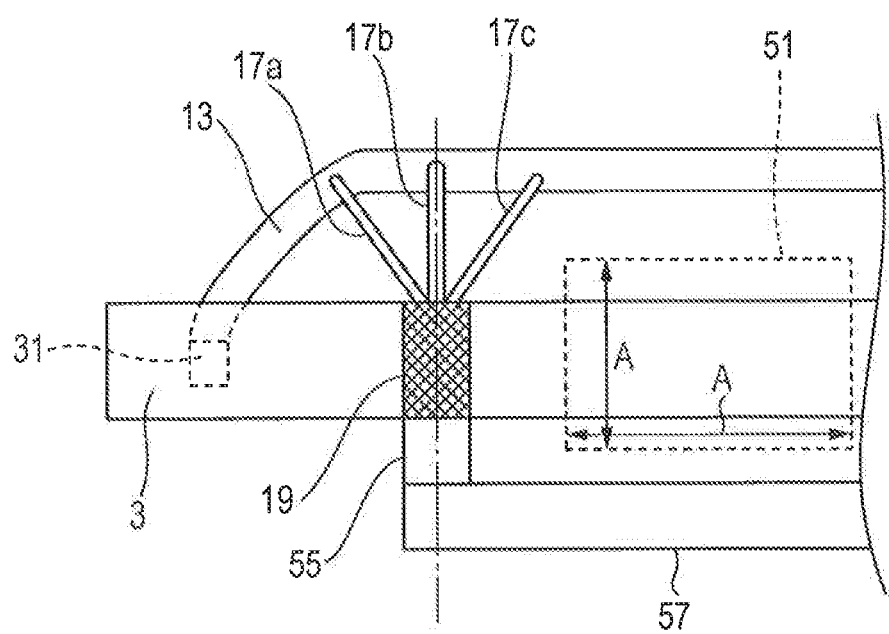
FIG. 10 is a side elevation view similar to FIG. 2C, illustrating a fifth implementation of the invention.

FIG. 10 is a side elevation view similar to FIG. 2C, illustrating a fifth implementation of the invention.

In the fourth implementation, the reinforced portion 19 is provided in the area A on the outward side surface of the engine 51. However, since the suspension cross member 55 bridges between two main frames 3 and holds the front tires, the member 55 has high stiffness. Accordingly, even if there is no engine 51 to be used as the reaction force exerting member, the suspension cross member 55 can be used in place of the engine 51.

In the fifth implementation, the reinforced portion 19 is disposed outside the area of the engine 51. A cradle 57 is disposed below the main frame 3. The cradle 57 is connected with the suspension cross member 55. The cradle 57 extends in the frontward and backward directions. In the fifth implementation, since the suspension cross member 55 enhances a strength of the main frame 3, the cradle 57 is not indispensable. It is possible to eliminate the cradle 57.

Figure 11A:
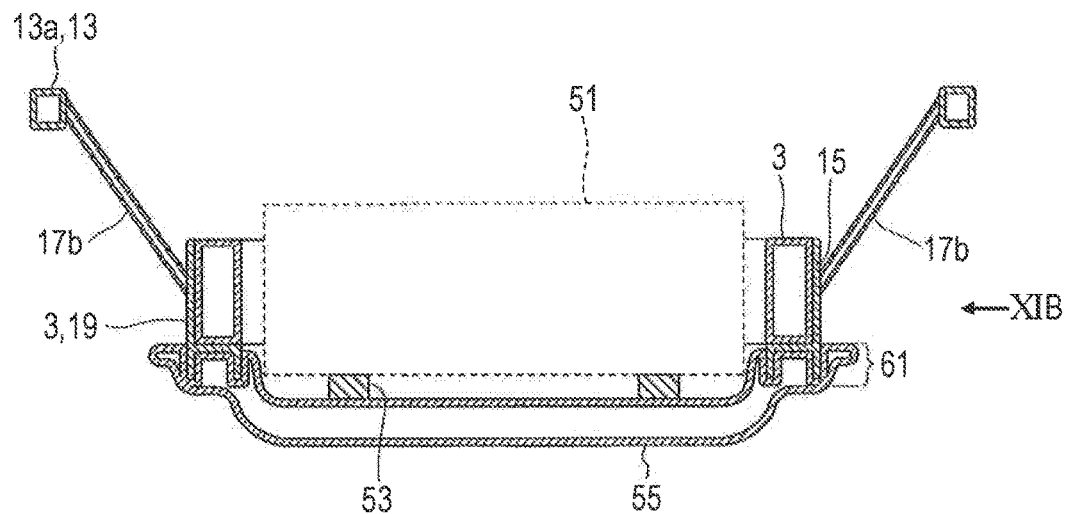
FIG. 11A is a cross sectional view similar to FIG. 7B, illustrating a sixth implementation of the invention.
Figure 11B:
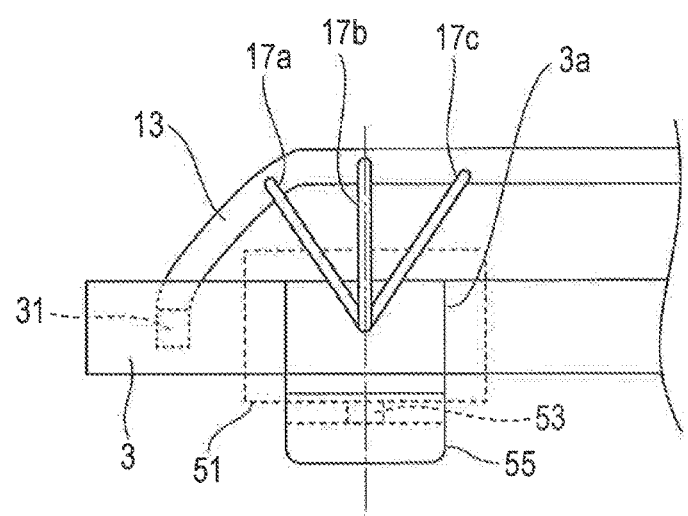
FIG. 11B is a side elevation view looked from an arrow XIB in FIG. 11A, illustrating a sixth implementation of the invention.

FIG. 11A is a cross sectional view similar to FIG. 7B, illustrating a sixth implementation of the invention. FIG. 11B is a side elevation view looked from an arrow XIB in FIG. 11A, illustrating a sixth implementation of the invention.

There is a case where the main frame 3 has a bracket unit 61 so that the main frame 3 is connected with the suspension cross member 55. A portion that is connected with the bracket unit 61 on the main frame 3 has a strength which is higher than that of the other portions on the main frame 3. Accordingly, if the reinforcing unit 17 is connected to the bracket unit 61, the sixth implementation can obtain the same effect as that of the fourth implementation. For this reason, the reinforcing unit 17 is connected through the connecting member 15 to the bracket unit 61 in the sixth implementation.

Although the bracket unit 61 and the main frame 3 are made of different elements in FIG. 11A, the bracket unit 61 may be formed by deforming the main frame 3. Also, although the bracket unit 61 and the main frame 3 are made of different elements in FIG. 11A, the connecting member 15 may be used as a part of the bracket unit 61. In this case, the bracket unit 61 is directly connected with the reinforcing unit 17. Furthermore, the connecting member 15 may be omitted and the reinforcing unit 17 may be directly connected with a portion that is illustrated as the bracket unit 61 in FIG. 11A.

Figure 12:
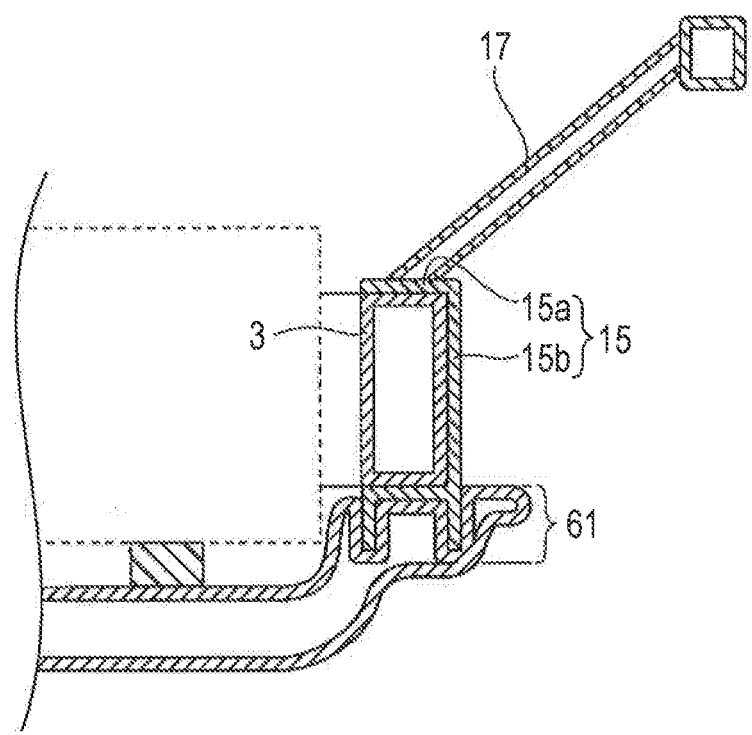
FIG. 12 is a cross sectional view similar to a part of FIG. 11A, illustrating an alteration of the sixth implementation.

FIG. 12 is a cross sectional view similar to a part of FIG. 11A, illustrating an alteration of the sixth implementation.

As illustrate in FIG. 12, there is a case where the connecting member 15 is desired to be connected with the reinforcing unit 17 on the upward side surface of the main frame 3, as is the case with the alteration of the fourth implementation illustrated in FIG. 9. In the case where the reinforcing unit 17 and the connecting member 15 are connected with the upward side surface of the main frame 3, the connecting member 15 has an upper portion 15a disposed on the upward side surface of the main frame 3 and an inner portion 15b disposed on the inward side surface of the main frame 3.

Even in the alteration of the sixth implementation, although the bracket unit 61 and the main frame 3 are made of different elements, as is the case with the sixth implementation illustrated in FIG. 11A, the bracket unit 61 may be formed by deforming the main frame 3. Although the bracket unit 61 and the connecting member 15 are made of different elements, the connecting member 15 may be provided by a part of the bracket unit 61. In this case, the reinforcing unit 17 is directly connected with the part of the bracket unit 61. Furthermore, the connecting member 15 may be omitted and the reinforcing unit 17 may be directly connected with the portion illustrated as the bracket unit 61 in FIG. 12.

Figure 13:
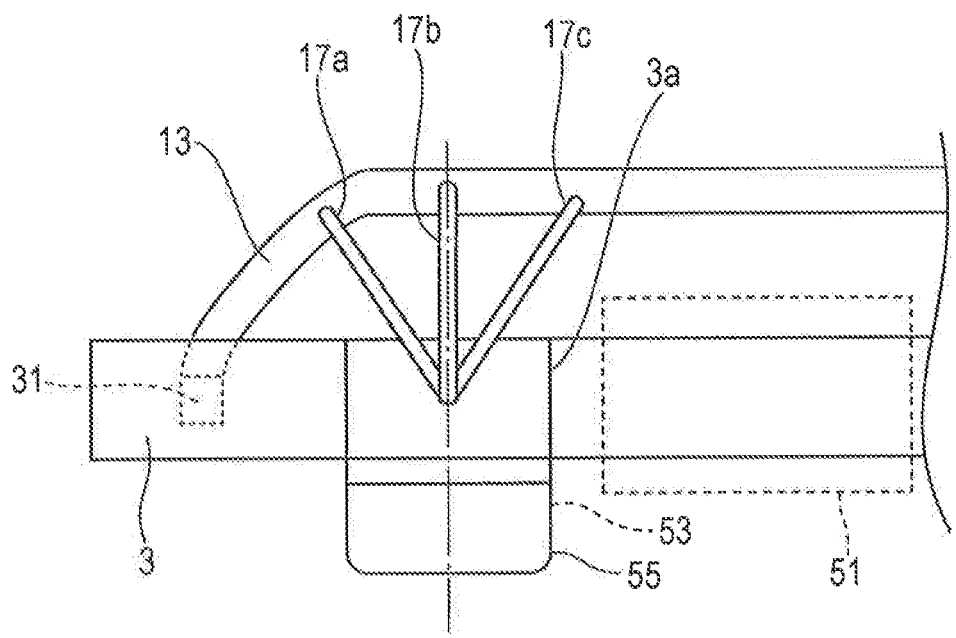
FIG. 13 is a side elevation view similar to FIG. 11B, illustrating a seventh implementation of the invention.

FIG. 13 is a side elevation view similar to FIG. 11B, illustrating a seventh implementation of the invention.

In the case of the sixth implementation illustrated in FIG. 12, it is not necessary to arrange the bracket unit 61 in the area A on the outward side surface of the engine, as illustrated in FIG. 13. The reason is described in connection with the fifth implementation illustrated in FIG. 10.

Figure 14A:
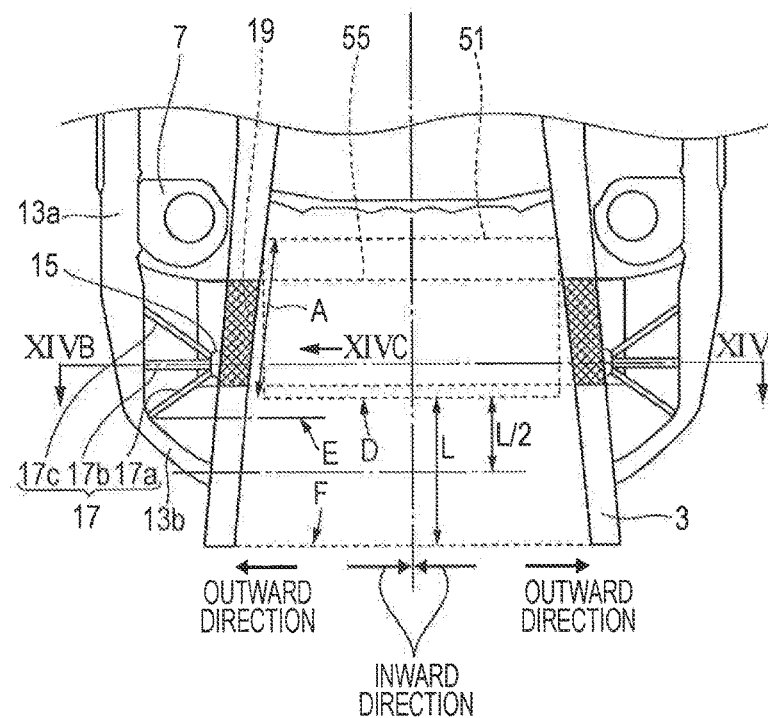
FIG. 14A is a plan view of a part of the vehicle body structure, illustrating an eighth implementation of the invention.
Figure 14C:
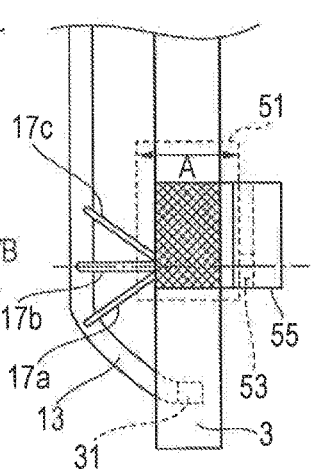
FIG. 14C is a side elevation view looked from an arrow XIVC in FIG. 14A.
Figure 14B:
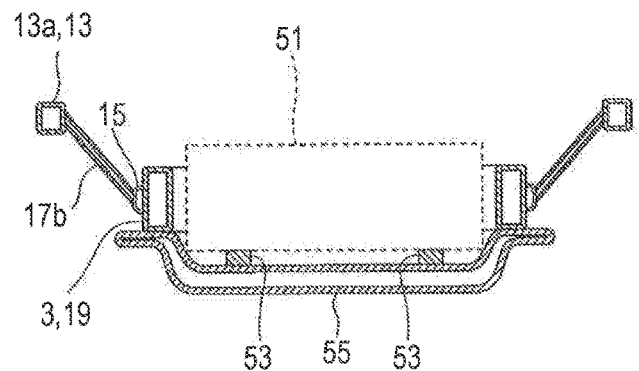
FIG. 14B is a cross sectional view taken along a line XIVB-XIVB in FIG. 14A.

FIG. 14A is a plan view of a part of the vehicle body structure, illustrating an eighth implementation of the invention. FIG. 14B is a cross sectional view taken along a line XIVB-XIVB in FIG. 14A. FIG. 14C is a side elevation view looked from an arrow XIVC in FIG. 14A.

The reinforcing unit 17 interconnects the upper frame 13 (the upper frame straight portion 13a and the upper frame curved portion 13b) and the main frame 3. In more detail, the reinforcing unit 17 bridges between the upper frame 13 and the reinforced portion 19 of the main frame 3. The reinforced portion 19 has a strength which is higher than that of the other portions of the main frame 3.

In the eighth implementation, since the suspension cross member 55 is connected with the main frame 3, the reinforced portion 19 results in a high strength (see FIG. 14A and FIG. 14B). However, it is not necessary in the eighth implementation that a strength of the reinforced portion 19 of the main frame 3 becomes higher than that of the other portions of the main frame 3 only by connecting the suspension cross member 55 to the main frame 3. The strength of the portion 19 may be increased by inserting another reinforcing unit into a space between the portion 19 and the main frame 3.

As illustrated in FIG. 14B, the engine 51 is connected to and is fixed on the suspension cross member 55 through the engine mount 53. The suspension cross member 55 operates to hold a member which supports front tires.

Since the suspension cross member 55 is connected with the main frame 3, this connected portion has a strength which is higher than that of the other portion of the main frame 3. In the eighth implementation of the invention, the reinforced portion 19 is defined as a portion of the main frame 3 that has s higher strength than that of the other portions of the main frame 3.

In the eighth implementation, the reinforced portion 19 may be formed not only by the connection of the suspension cross member 55 but also by a connecting unit that has a large thickness so as to connect a flange, a bolt, a nut, or the like to the main frame.

The connecting member 15 is disposed on the reinforced portion 19. A portion of the reinforcing unit 17 connected with the main frame 3 by the connecting member 15 coincides with a position of the outward side surface of the engine 51 (a position in the frontward, backward, upward, and downward directions). That is, the reinforced portion 19 is arranged on an area of the outward side surface of the engine 51 (an area A in FIG. 14A and an area A in FIG. 14C).

As illustrated in FIG. 14A, a position E where a first reinforcing member 17a that is arranged at the most frontward position is connected with the upper frame 13 is disposed near the engine 51 by a distance which is smaller than one-half of a distance L between a first position F at the most frontward side of the main frame 3 and a second position D at the frontward side of the engine 51. In other words, the connection position E between the first reinforcing member 17a and the upper frame 13 is separated from the engine 51 by a distance which is smaller than one-half of the distance L. In further other words, in the case where a distance from the distal end of the main frame 3 in the frontward direction to the frontward side surface of the engine 51 is divided by one-half, the reinforcing unit 17 (the reinforcing member 17a) is connected with the upper frame 13 at the backward side position beyond the position of the one-half distance.

Figure 15A:
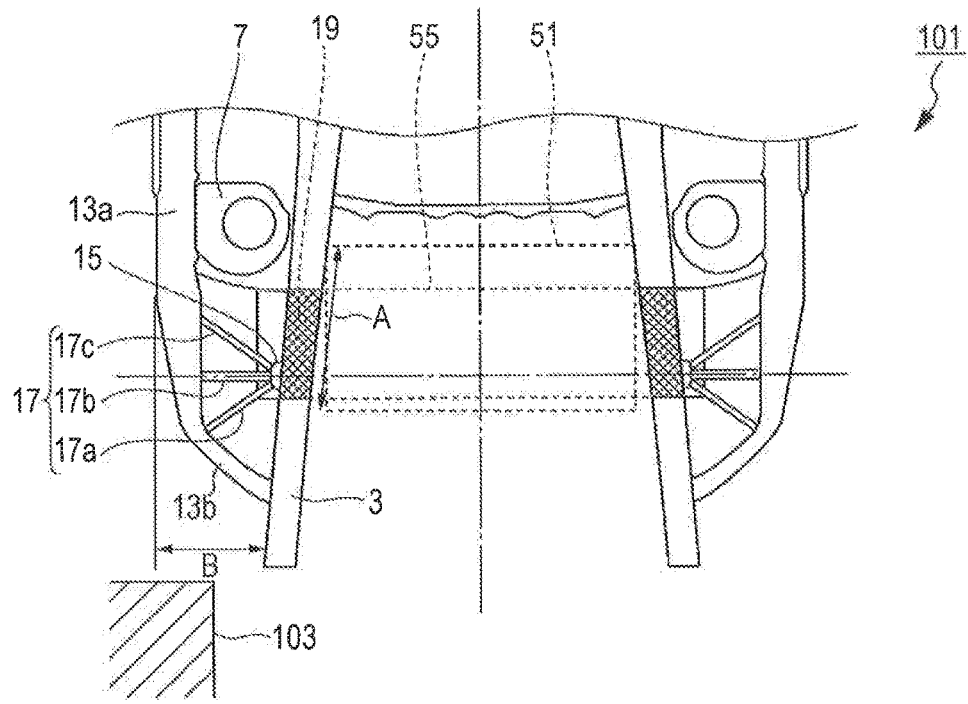
FIG. 15A is a plan view similar to FIG. 14A, illustrating a state immediately before a crash between the vehicle and the object.
Figure 15B:
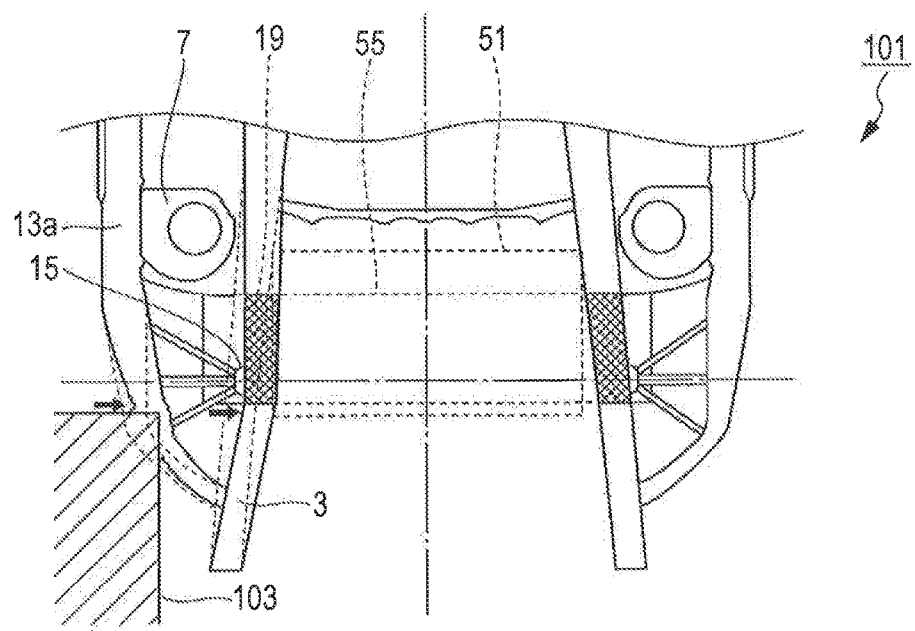
FIG. 15B is a plan view similar to FIG. 14A, illustrating a state immediately after the crash so as to demonstrate an operational effect of the vehicle body structure in the eighth implementation.

FIG. 15A and FIG. 15B illustrate an operational effect of the eighth implementation. FIG. 15A is a plan view similar to FIG. 14A, illustrating a state immediately before a crash between the vehicle 101 and the object 103. FIG. 15B is a plan view similar to FIG. 14A, illustrating a state immediately after the crash so as to demonstrate an operational effect of the vehicle body structure in the eighth implementation.

As illustrated in FIG. 15A and FIG. 15B, the eight implementation is different from the first implementation with respect to the suspension cross member 55.

Unless a configuration and operational effects of the eighth implementation are described particularly, the same matters also apply to the other implementations and their alterations described after. In order to simplify the descriptions, matters that are same will be omitted hereinafter.

All of the reinforced portion 19 may not be disposed in the area A on the outward side surface of the engine. A part of the reinforce portion 19 may be disposed in the area A.

The connection position E between the first reinforcing member 17a and the upper frame 13 is disposed within one-half of the distance L from the engine 51, as illustrated in FIG. 14A. This can exert a reaction force at a suitable position. The distance L is defined as a distance from the distal end of the main frame 3 to the frontward side surface of the engine 51.

The reason why the position E is decided within one-half of the distance L will be explained. Firstly, it is possible to design the connection portion between the upper frame curved portion 13b and the main frame 3 so as to generate a high reaction force (although the connection portion is disposed near one-half of the distance L in FIG. 14A, this is not limited). Usually, the connection portion can generate the high reaction force.

Next, the connection position E between the first reinforcing member 17a and the upper frame 13 can similarly generate a high reaction force. For example, in the case where the connection position E is arranged near the position F of the distal end of the main frame 3, a position, which generates a large reaction force, concentrates in the frontward direction of the main frame 3. This is because the connection position between the upper frame curved portion 13b and the main frame 3 and the connection position E are approached to the frontward side direction.

On the contrary, the reaction force is not exerted at a position separated apart in the backward direction slightly from the approached position. A phenomenon that the reaction force is not exerted or that the reaction force becomes small will cause an unsuitable position that does not absorb any energy at a crash. This is not suitable in view of absorption of the crash energy. On the other hand, if a position in which the reaction force is extremely high is caused, there is a problem that a damage value will increase. Accordingly, it is desirable that a constant reaction force is exerted uniformly through a long distance in the frontward and backward directions.

Thus, in the eighth implementation, the position E that exerts the reaction force is disposed within one-half of the distance L from the engine 51, thereby dispersing the reaction exerting-positions. Usually, the position E is disposed in the backward direction beyond the connection portion between the upper frame curved portion, which is designed to exert a high reaction force, and the main frame.

It is also preferable that the connection portion between the upper frame curved portion 13b and the main frame 3 is arranged within one-half of the distance L. This is based on two reasons. Firstly, if the connection position between the upper frame curved portion 13b and the main frame 3 gets near to the position D, the position E approaches the position D and the reaction force is concentrated. The position E is usually disposed in the backward direction from the connection position between the upper frame curved portion 13b and the main frame 3. Secondly, even if the connection position between the upper frame curved portion 13b and the main frame 3 is disposed near the position F, the reaction force is concentrated similarly.

Accordingly, it is preferable that the position F, the position E between the upper frame curved portion 13b and the main frame 3, and a center position of the area A (substantially, the center position of the reinforced portion 19) are substantially arranged in a uniform manner. This is because these positions generate the reaction forces and uniform reaction forces below a given value are generated by arranging these positions uniformly.

It is possible to select a position in which the upper frame 13 is bent by suitably selecting the position of connection position between the reinforcing unit 17 and the upper frame 13. For example, it is possible to select a position between the reinforcing unit 17 and the upper frame 13 at the connection position between the upper frame curved portion 13b and the main frame 3 or a position (FIG. 14A) at the side of the upper frame curved portion 13b slightly near the connection position. The position between the reinforcing unit 17 and the upper frame 13 is a position in which the upper frame 13 will be most deformed in the inward direction (a direction Y) in the case of the small overlap crash.

It is also possible to suitably determine the bent position of the upper frame 13 by selecting the number, a strength, or the like of the reinforcing unit 17.

Even at the full-width front crash, it is also possible to suitably determine the bent position of the upper frame 13 by selecting the number, a strength, or the like of the reinforcing unit 17. This means that an amount of the reaction force against a crash force can be selected suitably at the full-width front crash.

Furthermore, at the full-width front crash, the reinforcing unit 17 can restrain the upper frame 13 from being deformed in the upward and downward directions, although the upper frame is deformed in the upward and downward directions.

Furthermore, as illustrated in FIG. 15A and FIG. 15B, it is possible to keep the upper frame 13 in an arcuate shape at the small overlap crash by setting the connection position between the reinforcing members 17a, 17b, 17c and the main frame 3 to be the same position (a single point) and by designing the reinforcing members so as to extend radially from the main frame 3.

Also, by setting the connection position between the reinforcing members 17a, 17b, 17c and the main frame 3 to be the same position (a single point) and by designing the reinforcing members so as to extend radially from the main frame 3, it is possible to select a position and an amount of the reaction force against the crash force at the full-width front crash.

Figure 16:
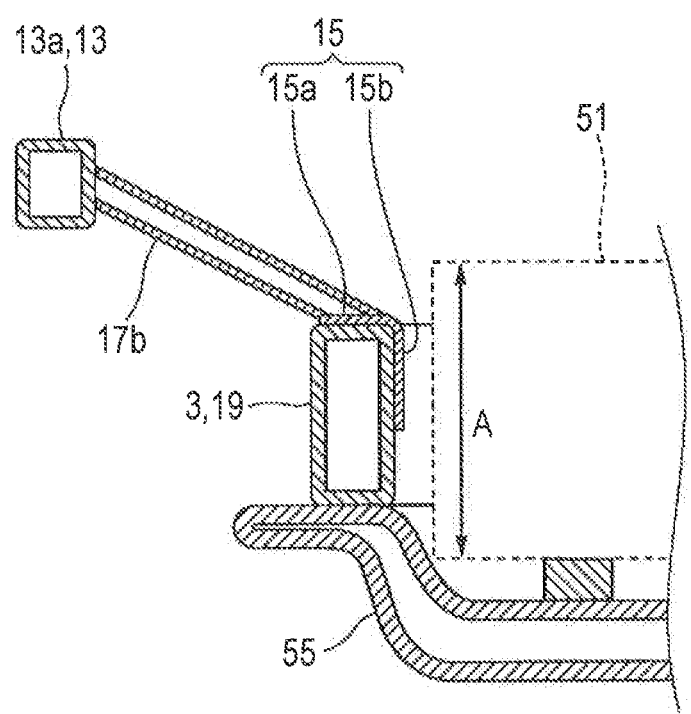
FIG. 16 is a cross sectional view similar to a part of FIG. 11A, illustrating an alteration of the eighth implementation.

FIG. 16 is a cross sectional view similar to a part of FIG. 11A, illustrating an alteration of the eighth implementation. In the eighth implementation, the connecting member 15 is disposed on outward side surface of the main frame 3 (the reinforced portion 19). However, there is an advantageous case, if the connecting member 15 is connected with the upward side surface of the main frame 3. For example, it is advantageous that another member should be disposed on the side surface of the main frame 3.

In the case where the connecting member 15 is connected with the upward side surface of the main frame 3, the connecting member 15 has an upper portion 15a disposed on the upward side surface of the main frame 3 and an inner portion 15b disposed on the inward side surface of the main frame 3. The upper portion 15a is connected with the reinforcing unit 17. The inner portion 15b is arranged on the area A at a position outward from to one side of the engine 51 (a position in the forward, backward, upward, and downward directions is arranged in the area A). Accordingly, it is possible to use the engine 51 as the reaction force exerting member, while the position of connection between the main frame 3 and the reinforcing unit 17 is kept at the upward side surface of the main frame 3.

Figure 17:
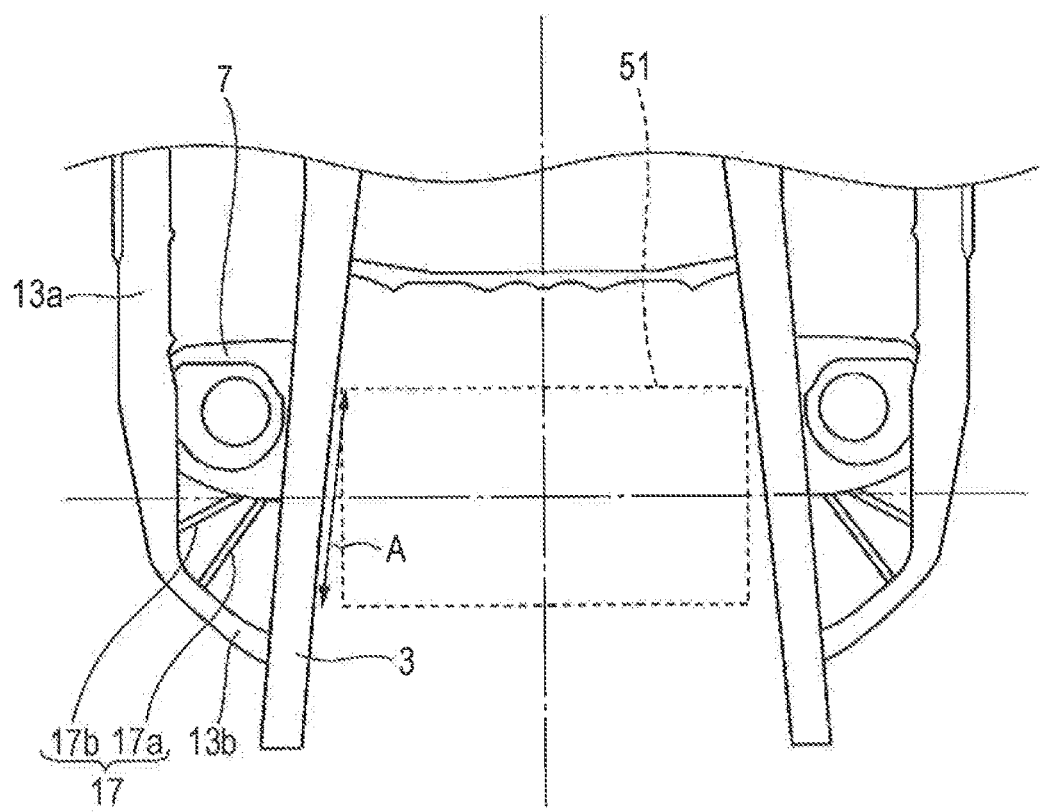
FIG. 17 is a plan view of a part of the vehicle body structure, illustrating a ninth implementation of the invention.

FIG. 17 is a plan view of a part of the vehicle body structure, illustrating a ninth implementation of the invention.

The upper suspension holder 7 has a relatively high strength in order to hold the upper suspension member. It is possible to exert the above effect by arranging the upper suspension holder 7 on the area A at the side surface position of the engine. In this case, the reinforcing unit 17 is connected with the upper suspension holder 7.

Figure 18:
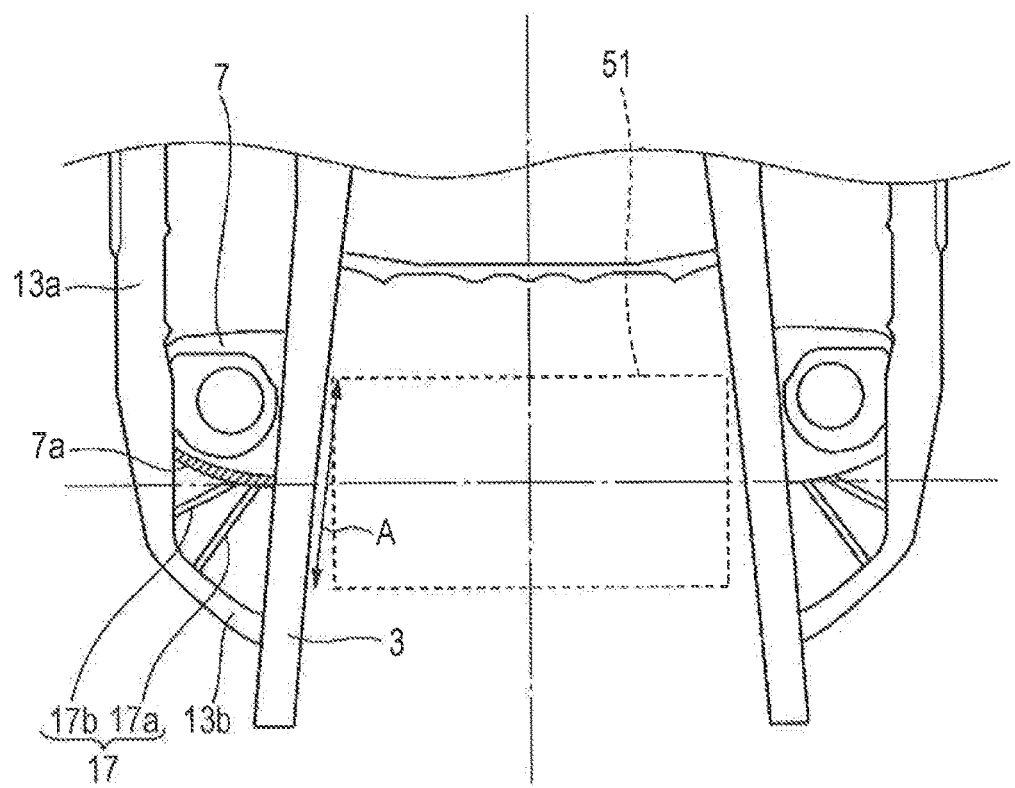
FIG. 18 is a plan view of a part of the vehicle body structure, illustrating a tenth implementation of the invention.

FIG. 18 is a plan view of a part of the vehicle body structure, illustrating a tenth implementation of the invention.

The tenth implementation is different from the ninth implementation, since the suspension reinforcing member 7a is provided on the upper suspension holder 7 in order to reinforce the member 7.

FIG. 19A is a plan view of a part of the vehicle body structure, illustrating an eleventh implementation of the invention. FIG. 19B is a cross sectional view taken along a line XIXB-XIXB in FIG. 19A. FIG. 19C is a side elevation view looked from an arrow XIXC in FIG. 19A.

In the eleventh implementation, since the suspension cross member 55 is connected with the main frame 3, the reinforced portion 19 results in a high strength (see FIG. 19A and FIG. 19B). However, it is not necessary in the eleventh implementation that the strength of the reinforced portion 19 of the main frame 3 becomes higher than that of the other portions of the main frame 3 only by connecting the suspension cross member 55 to the main frame 3. The strength of the portion 19 may be further increased by inserting another reinforcing unit into a space between the portion 19 and the main frame 3.

As illustrated in FIG. 19B, the engine 51 is connected to and is fixed on the suspension cross member 55 through the engine mount 53. The suspension cross member 55 operates to hold a member which supports front tires.

Since the suspension cross member 55 is connected with the main frame 3, the connected portion has a strength which is higher than that of the other portion of the main frame 3. In the eleventh implementation of the invention, the reinforced portion 19 is defined as a portion of the main frame 3 which has a higher strength than the other portions of the main frame 3.

In the eleventh implementation, the reinforced portion 19 may be made not only by the connection of the suspension cross member 55 but also by a connecting unit that has a large thickness so as to connect a flange, a bolt, a nut, or the like to the main frame.

The connecting member 15 is disposed on the reinforced portion 19. A position where a portion of the reinforcing unit 17 is connected to the main frame 3 by the connecting member 15 coincides with a position of the outward side surface of the engine 51 (a position in the frontward, backward, upward, and downward directions). That is, the reinforced portion 19 is arranged on the area A of the outward side surface of the engine 51 (the area A in FIG. 19A and the area A in FIG. 19C).

Figure 20A:
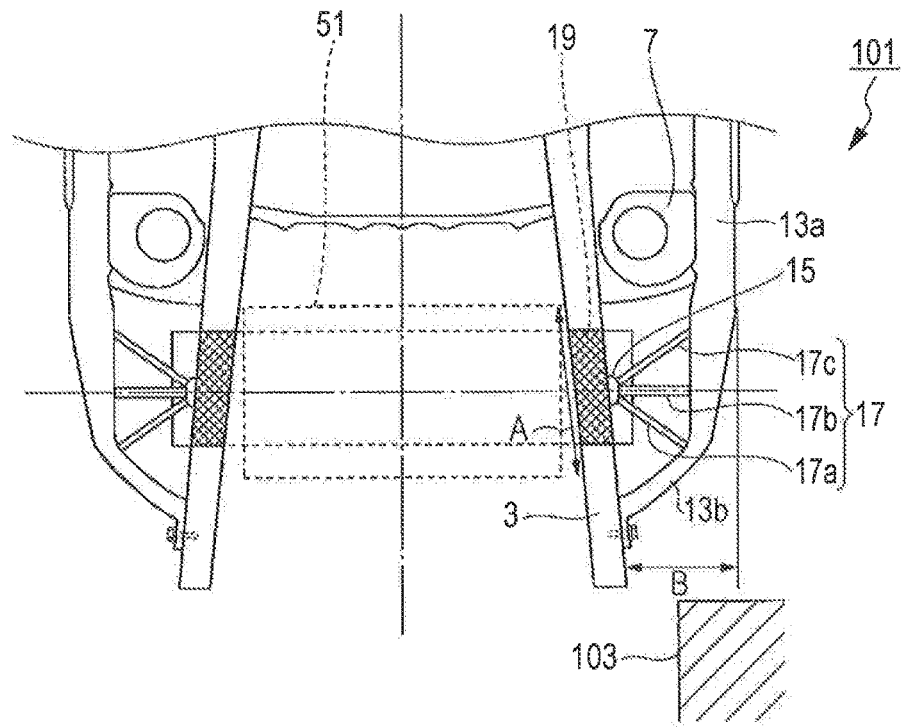
FIG. 20A is a plan view similar to FIG. 19A, illustrating a state immediately before a crash between the motor vehicle and the object.
Figure 20B:
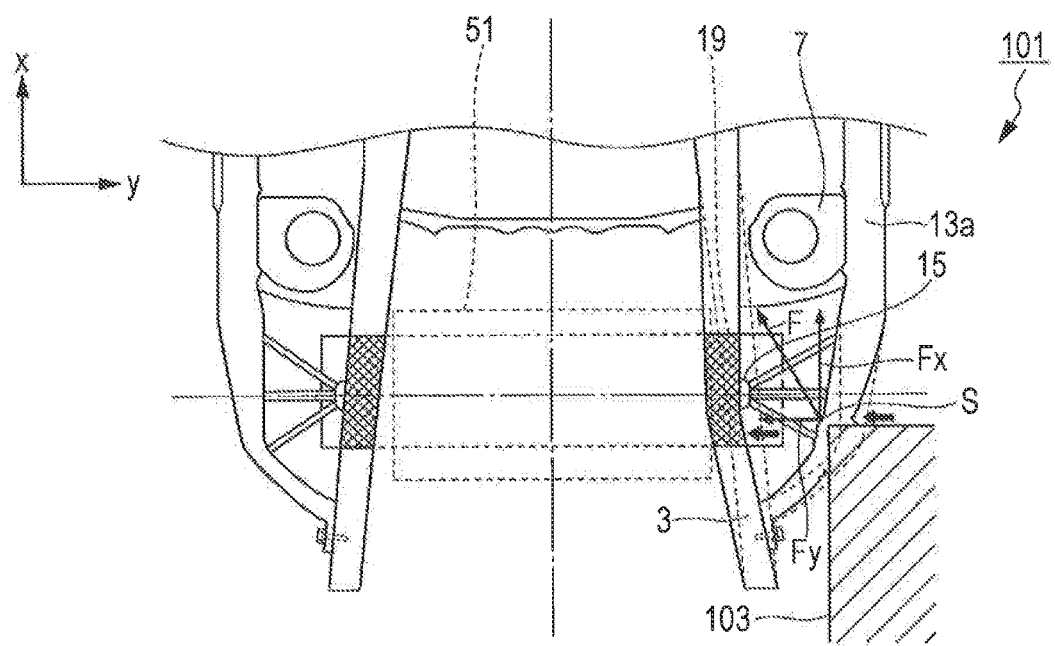
FIG. 20B is a plan view similar to FIG. 19A, illustrating a state immediately after a small overlap crash so as to demonstrate an operational effect of the vehicle body structure in the eleventh implementation.

FIG. 20A and FIG. 20B illustrate a state at the small overlap crash. FIG. 20A is a plan view similar to FIG. 19A, illustrating a state immediately before a crash between the vehicle 101 and the object 103. FIG. 20B is a plan view similar to FIG. 19A, illustrating a state immediately after the crash so as to demonstrate an operational effect of the vehicle body structure in the eleventh implementation.

On the assumption that a crash between the vehicle 101 and the object 103 (an oncoming vehicle, an installed object, or the like) happens, an operational effect of the eleventh implementation will be described below. A small overlap crash is defined as a crash in which only an outer part of the main frame 3 (an area B in FIG. 20A) comes into contact with the object 103.

It is possible to suppose that the crash force will be schematically applied to a center point S on the upper frame 13 at the small overlap crash, as illustrated in FIG. 20B. When an axial direction X is defined as the inward direction and an axial direction Y is defined as the backward direction (see FIG. 1), a crash force F can be divided into a force Fx in the axial direction X and a force Fy in the axial direction Y.

Figure 21A:
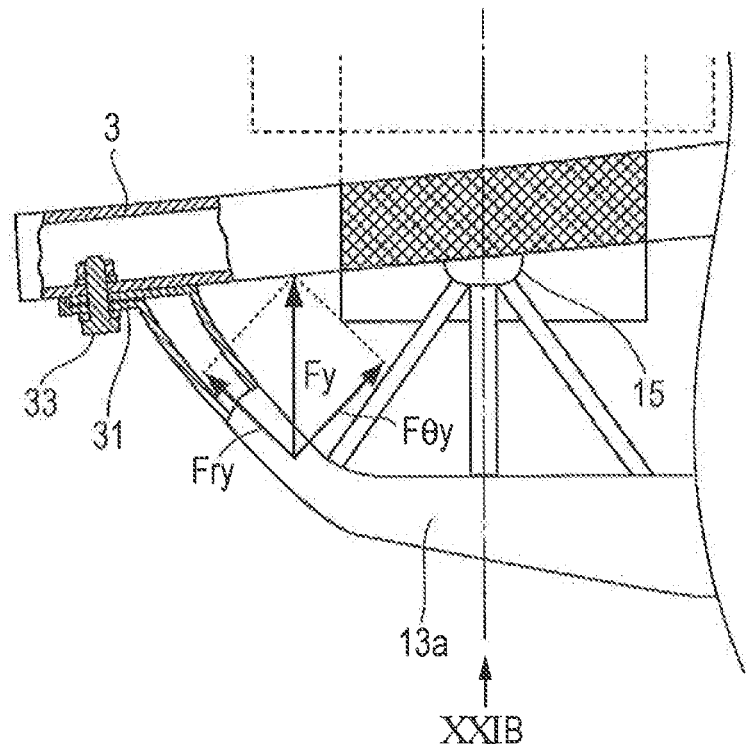
FIG. 21A is a plan view of a part of the vehicle body structure shown in FIG. 19A, illustrating an operational effect of the eleventh implementation of the invention.
Figure 21B:
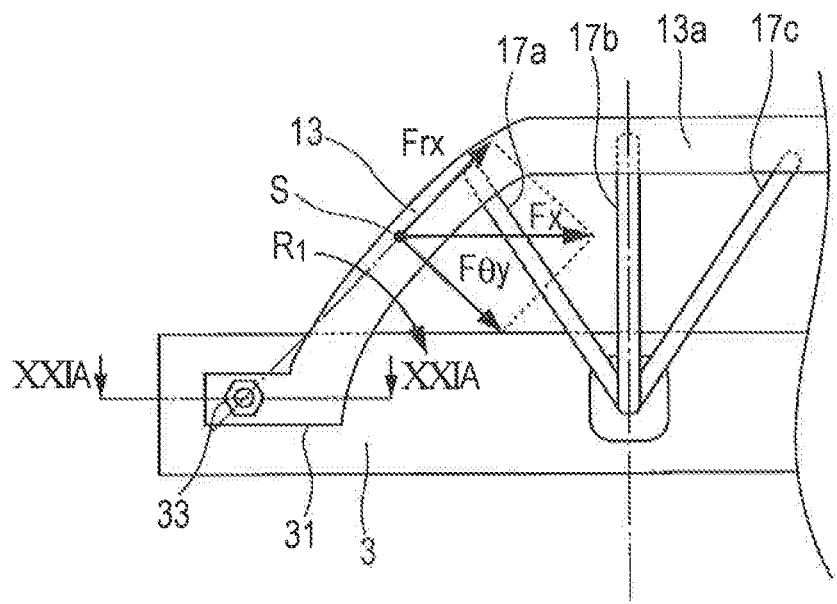
FIG. 21B is a side elevation view looked from an arrow XXIB in FIG. 21A, illustrating an operational effect of the eleventh implementation of the invention.

FIG. 21A is a plan view of a part of the vehicle body structure shown in FIG. 19A, illustrating an operational effect of the eleventh implementation of the invention. FIG. 21B is a side elevation view looked from an arrow XXIB in FIG. 21A, illustrating an operational effect of the eleventh implementation of the invention.

As illustrated in FIG. 21A, a connecting portion 31 of the upper frame 13 is connected with the outward side surface of the main frame 3. In more detail, the bolt-nut unit 33 is inserted into a single through-hole provided near the center of the connecting portion 31 so as to couple the connecting portion 31 to the upper frame 13, as illustrated in FIG. 21B. A screw may be used in place of the bolt-nut unit 33. That is, the upper frame 13 and the main frame 3 are pivotally interconnected to each other about an axis extending inward and outward directions.

In the eleventh implementation, even if the force Fy (see FIG. 20B) in the direction Y of the crash force F is applied to the upper frame 13, the vehicle body structure can support the force Fy. In more detail, a force Fry toward the connecting portion 31 out of the force Fy in the direction Y of the crash force F is supported by the connection between the main frame 3 and the connecting portion 31. Also, a force F$\theta$y perpendicular to the force Fry toward the connecting portion 31 out of the force Fy in the direction Y of the crash force F is supported by the upper frame 13. Accordingly, the vehicle body has a strong structure against the force Fy in the direction Y of the crash force F in the eleventh implementation.

In the case where a load in the direction Y is applied to the upper frame 13, the main frame 3 can be utilized as a reaction member. An example in which the force F is often applied to the vehicle body in the direction Y is a case where another vehicle crashes against the side of the motor vehicle 101 in question from the outward side position to the inward side position.

Next, a force in the direction X will be described below.

As illustrated in FIG. 21B, since the eleventh implementation has the above structure, the upper frame 13 can be pivoted when a force Fx in the direction X of the crash force F is applied to the upper frame 13. In more detail, a force Frx toward the reverse direction from the connecting portion 31 out of the force Fx in the direction X of the crash force F is supported by the connection between the main frame 3 and the connecting portion 31 by means of the bolt-nut unit 33.

However, the connecting portion 31 exerts only a small reaction force against a force F$\theta$x perpendicular to the force Frx toward the reverse direction from the connecting portion 31 out of the force Fx in the direction X of the crash force F on account of a structure of the connecting portion 31. This is because the connecting portion 31 is supported on the main frame 3 by the single bolt-nut unit 33. As a result, the upper frame 13 can pivot freely on the main frame 3 to some extent.

An example in which the force F is often applied to the vehicle body in the direction X is the following case. A load is applied to not only the main frame 3 but also the upper frame 13 by the full-width front crash. In this case, the main frame 3 is deformed heavily. At this time, if the upper frame 13 cannot pivot on the main frame 3 as distinct from the eleventh implementation, deformation of the upper frame 13 is blocked. This is because the upper frame 13 is strongly secured to the main frame 3 so as not to pivot, even if the upper frame 13 is likely to be deformed by a load applied to the upper frame 13, in the case where a relative pivotal motion between the upper frame 13 and the main frame 3 is prevented. In other words, since the upper frame 13 and the main frame 3 can pivot with respect to each other to a certain extent, as is the case with the eleventh implementation, it is possible to prevent deformation of the main frame 3 from affecting the upper frame 13.

In the case where a predetermined position is set so as to absorb the crash load by the main frame 3, it is possible to prevent any change of the predetermined position that absorbs the crash load. As a result, a designer of the vehicle body does not design the absorbing position of the load at the crash in consideration of deformation of the upper frame 13 in a conventional design. That is, such design enables the designer to set an intended position for absorbing the crash.

Furthermore, the reinforcing unit 17 can exert the following operational effect. For example, in the case where the upper frame 13 is deformed at the full lap crash, the upper frame 13 is deformed in the upward direction or the downward direction. At the time, it is possible to restrain the deformation by the reinforcing member 17.

In the case of the small overlap crash, the upper frame 13 exerts a force in the direction Y. At the time, the reinforcing unit 17 functions as a member that has stiffness in which the upper frame 13 can keep an arcuate shape illustrated in FIG. 21A. Consequently, the reinforcing unit 17 can generate a required reaction force in the direction Y. In addition, this reaction force can apply a rotary action (a yawing action) to the motor vehicle 101. Such yawing action can convert crash energy into rotary energy at the small overlap crash of the motor vehicle 101. This enhances safety for a passenger or passengers in the motor vehicle. This will be available to the small overlap crash.

Furthermore, in the eleventh implementation, the reinforcing unit 17 functions as a member that generates the reaction force at the small overlap crash so that the upper frame 13 (in particular, the upper frame curved portion 13b) is not deformed (see FIG. 20B). That is, since the connecting member 15 is connected with the outward side surface of the main frame 3 that has a high strength, it is possible to prevent the upper frame 13 from being deformed by a crash between the motor vehicle 101 and the object 103.

Furthermore, in the eleventh implementation, since the reinforcing unit 17 is connected with the reinforced portion 19 that has a high strength on the main frame 3, it is possible to further hold the upper frame 3 in comparison with the case where the reinforcing unit 17 is connected with the other portions of the main frame 3. In addition, the reinforced portion 19 is disposed in the area A at a position at the side of the engine. Thus, even if any strong crash may happen so as to deform the main frame 3 in the inward direction, the engine 51 functions as a reaction force exerting member that can prevent the main frame 3 from being deformed. Accordingly, even if any stronger crash may happen, it is possible to prevent the main frame 3 from being deformed in comparison with a conventional case.

Even if the small overlap crash between the motor vehicle 101 and the object 103 happens, the upper frame 13 is not deformed. This will mean that any deformation does not affect the vehicle cabin space 5 in which there is a passenger or passengers. Further, the vehicle body does not affect any crash energy at a frontal offset crash to the vehicle cabin space 5 and it is possible to convert the crash energy into rotation energy of the motor vehicle 101.

In the eleventh implementation, the reinforcing unit 17 is connected with the outward side surface of the main frame 3. Accordingly, a force applied to the reinforcing unit 17 by a crash between the motor vehicle 101 and the object 103 is directly transmitted to the main frame 3. The force is naturally directed to the engine 51. This can enhance an effect of holding the upper frame 13 in the eleventh implementation.

Furthermore, the upper frame 13 (the upper frame curved portion 13b) is connected to the main frame 3 by the connecting portion 31. Thus, the strength of the upper frame 13 itself can be increased in comparison with the conventional motor vehicle in which the upper frame 13 is not connected with the main frame 3. According to this design, the vehicle body structure in the eleventh implementation has a high strength against a small overlap crash. In addition, the connection between the upper frame 13 and the main frame 3 is made on the outward side surface of the main frame 3. As a result, the main frame 3 functions as the reaction force member that can prevent the upper frame 13 from being deformed in the inward direction by a crash between the upper frame 13 and the object 103. According to this design, the vehicle body structure in the eleventh implementation has a high strength against a small overlap crash.

Furthermore, this structure has a high strength against a full-width front crash and a frontal offset crash. Since the upper frame 13 and the main frame 3 are connected with each other, it is possible for the upper frame 13 to exert a reaction force against a full-width front crash and a frontal offset crash.

It is possible to dispose the reinforcing unit 17 at any position on the upper frame 13. Accordingly, a designer can select a position where the reinforcing unit 17 exerts a reaction force against a small overlap crash (a full-width front crash and a frontal offset crash). Thus, the designer can design the motor vehicle 101 so as to exert the desired reaction force by selecting the position of connection between the reinforcing unit 17 and the upper frame 13.

As described above, the bolt-nut unit 33 prevents only a small pivotal motion. However, the bolt-nut unit 33 can increase a fastening force or a friction force, thereby preventing the relative pivotal motion. This makes it possible to select any reaction force against the force Fθx (Fx). As a result, the designer can select any amount of the reaction force, thereby designing the motor vehicle 101 that has a small damage value.

Unless a configuration and operational effects of the eleventh implementation are described particularly, the same matters also apply to a twelfth implementation through a fifteenth implementation. In order to simplify the descriptions, matters that are same will be omitted hereinafter.

The whole reinforced portion 19 is not disposed in the area A on the outward side surface of the engine. A part of the reinforced portion 19 may be disposed in the area A.

Figure 22A:
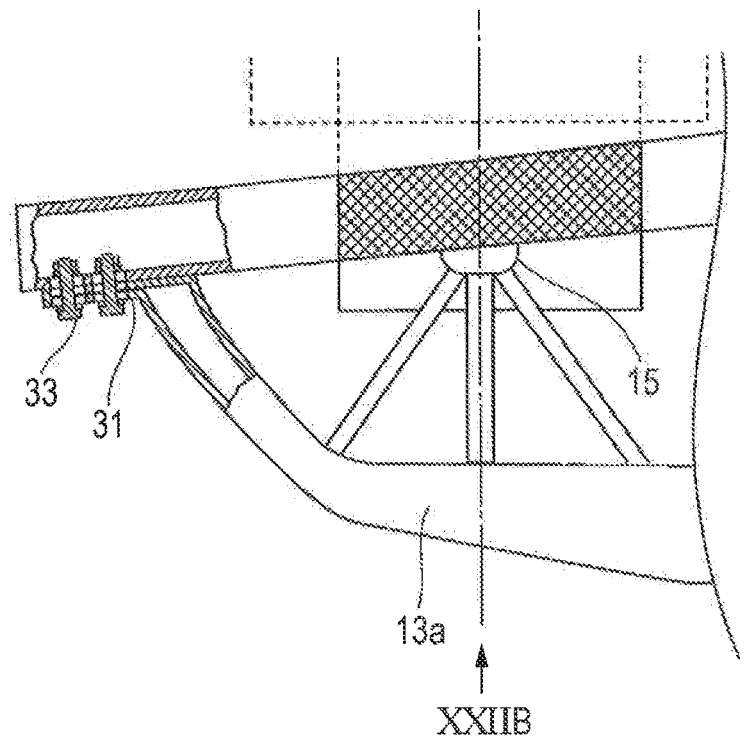
FIG. 22A is a plan view similar to FIG. 21A, illustrating a twelfth implementation of the invention.
Figure 22B:
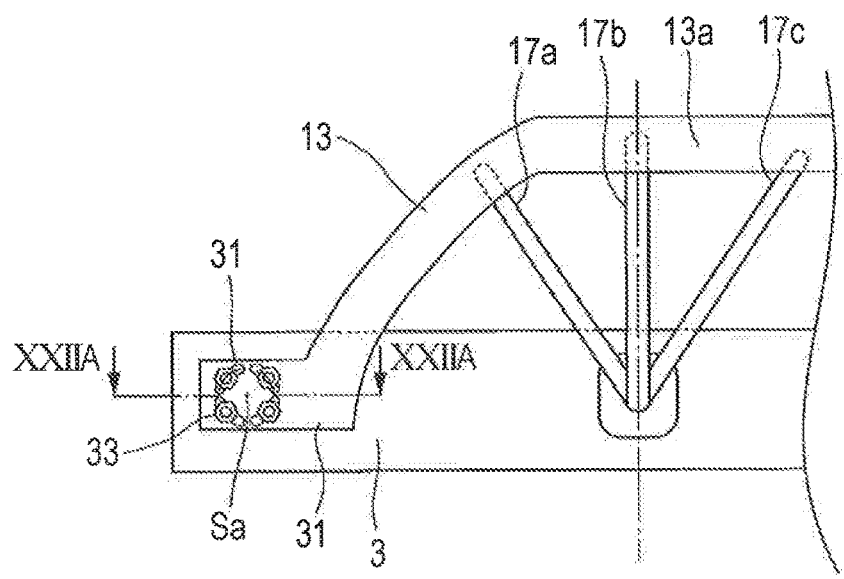
FIG. 22B is a side elevation view looked from an arrow XXIIB in FIG. 22A.

FIG. 22A is a plan view similar to FIG. 21A, illustrating a twelfth implementation of the invention. FIG. 22B is a side elevation view looked from an arrow XXIIB in FIG. 22A. A broken part in FIG. 22A is a cross sectional view taken along a line XXIIA-XXIIA in FIG. 22B.

In the eleventh implementation, the single bolt-nut unit 33 interconnects the upper frame 13 and the main frame 3 to each other. However, in at least a part of the operational effect in the eleventh implementation, the connection between the upper frame 13 and the main frame 3 can be pivotal by a pivotal force over a given value. As a result, the twelfth implementation illustrated in FIG. 22A and FIG. 22B can exert the same operational effect as that of the eleventh implementation.

Referring now to FIG. 22A and FIG. 22B, the twelfth implementation of the invention will be described below. As illustrate in FIG. 22A and FIG. 22B, a plurality of keyhole slots 31a are provided in the connecting portion 31. As illustrate in FIG. 22A, the keyhole slots 31a are disposed on a circle having a center Sa and are formed into through-holes on arc-shaped lines successively. In the case where a length of each keyhole slot 31a is small, the arc-shaped line may be a straight line.

In the twelfth implementation, it is possible to select any reaction force against the force Fθx (Fx), as is the case with the eleventh implementation. As a result, it is possible for a designer to design a motor vehicle that has a low damage value by generating any amount of the reaction force. The twelfth implementation is more preferable than the eleventh implementation with respect to the fact that a plurality bolt-nut units 33 are provided in the twelfth implementation and these units 33 can exert a reaction force against a larger rotating force. It is possible for a designer to enhance flexibility in design.

Figure 23A:
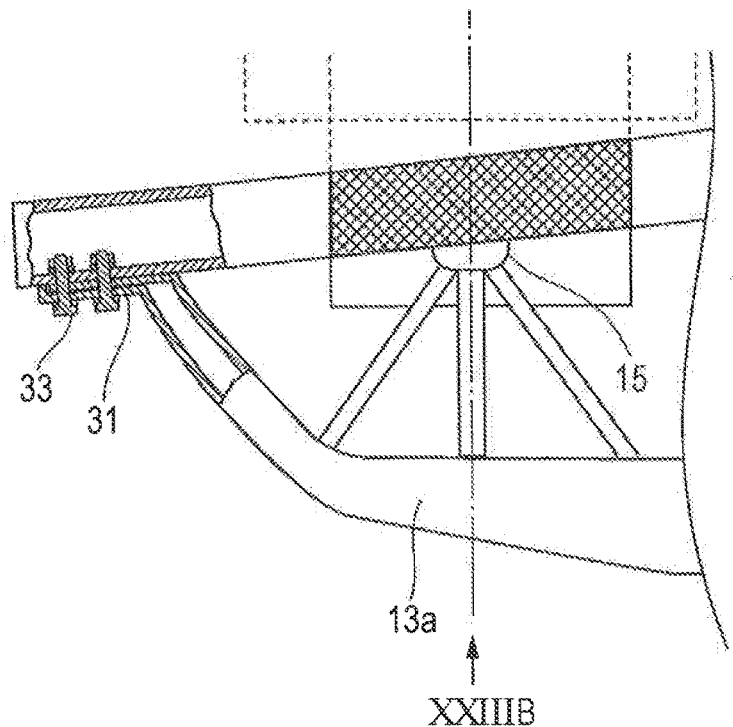
FIG. 23A is a plan view similar to FIG. 21A, illustrating a thirteenth implementation of the invention.
Figure 23B:
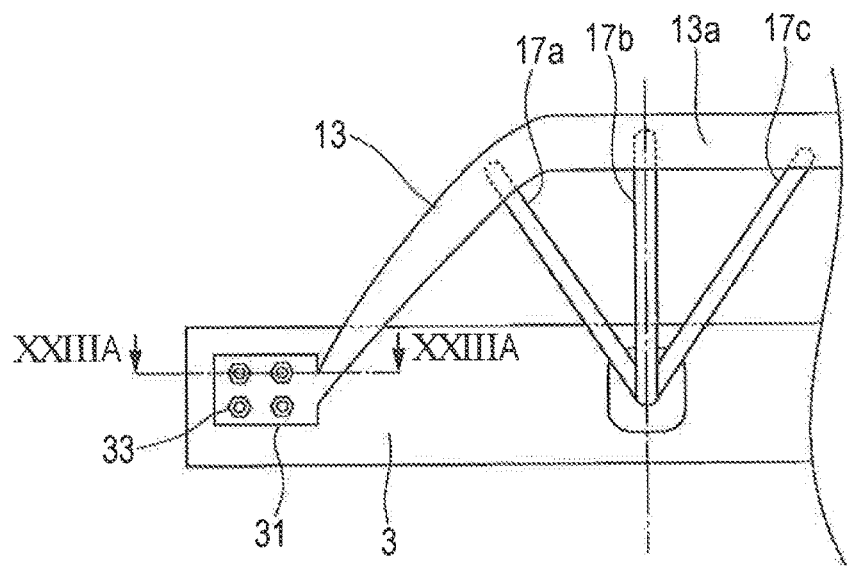
FIG. 23B is a side elevation view looked from an arrow XXIIIB in FIG. 23A.

FIG. 23A is a plan view similar to FIG. 21A, illustrating a thirteenth implementation of the invention. FIG. 23B is a side elevation view looked from an arrow XXIIIB in FIG. 23A. A broken part in FIG. 23A is a cross sectional view taken along a line XXIIIA-XXIIIA in FIG. 23B.

It is not always necessary in the thirteenth implementation to design connection between the connecting portion 31 and the main frame 3 to be rotatable, although the eleventh and twelfth implementation s require the rotatable connection. In more detail, the connecting portion 31 and the main frame 3 may be interconnected by a plurality of bolt-nut units 33 without using the keyhole slots. In this case, the upper frame 13 is provided with a distal end portion that has a small length in the upward and downward directions, as illustrated in FIG. 23B. In other words, the upper frame 13 has a small length in the upward and downward directions (a thickness in the lateral direction is not changed but a length in the longitudinal direction is increased) as the upper frame 13 approaches the main frame 3. Accordingly, since the cross section shape of the upper frame has a small length (a small thickness) in the upward and downward directions, the upper frame 13 can deflect readily in the upward and downward directions in a free state from the main frame 3. Thus, the thirteenth implementation can obtain the same operational effect as that of the eleventh and twelfth implementations.

Since a portion at which the upper frame 13 is connected with connecting portion 31 has the smallest strength, plastic deformation will start from this portion so as to pivot the upper frame 13. This means that a force against any pivotal force can be generated by suitably selecting a sectional area or the like of the portion in which the upper frame 13 is connected with the connecting portion 31. Consequently, it is possible for a designer to design a motor vehicle that has a lower damage value by exerting any amount of the reaction force.

Figure 24:
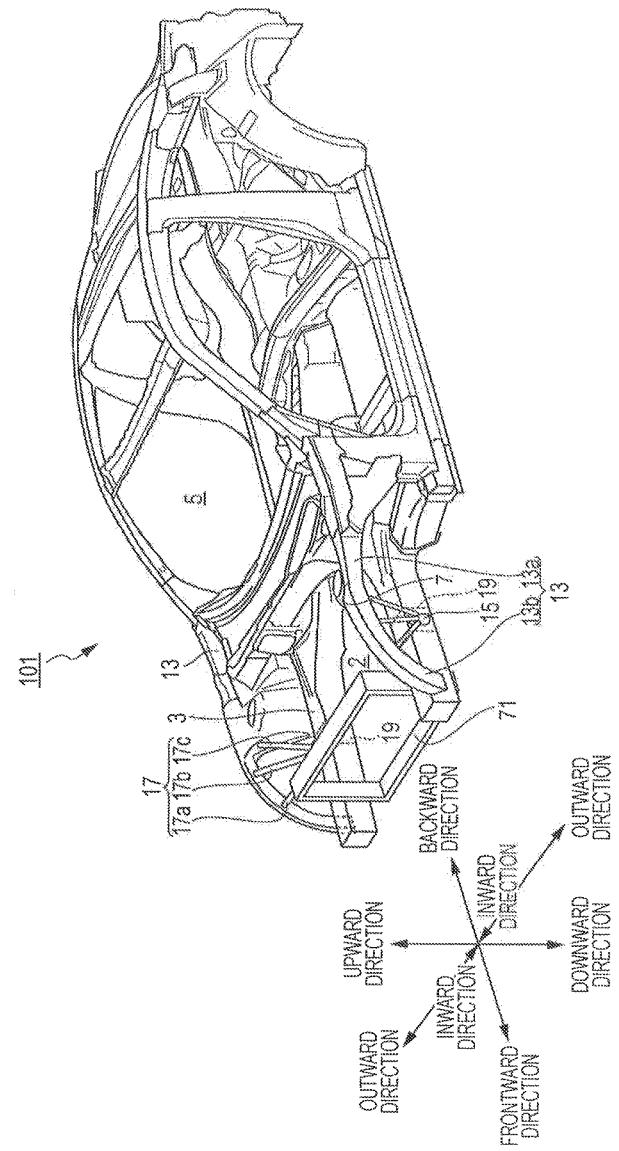
FIG. 24 is a schematically explanatory view similar to FIG. 1, illustrating a fourteenth implementation of the invention.

FIG. 24 is a schematically explanatory view similar to FIG. 1, illustrating a fourteenth implementation of the invention.

It is preferable in the eleventh implementation through the thirteenth implementation that the connecting portion 31 is disposed between the distal end of the vehicle body and a radiator panel 71, as illustrated in FIG. 24. Because a portion from the distal end of the vehicle body to the radiator panel 71 has a relatively high strength, it is possible to enhance a strength of the vehicle body. Furthermore, the portion of the main frame 3 disposed from the distal end of the vehicle body to the radiator panel 71 can be readily deformed at the crash. By designing this portion in the same manner as the eleventh implementation through the thirteenth implementation, it is possible to prevent deformation of the main frame 3 from affecting the upper frame 13. Conversely, by designing this portion in the same manner as the eleventh implementation through the thirteenth implementation, it is possible to prevent deformation of the upper frame 13 from affecting the main frame 3.

Figure 25A:
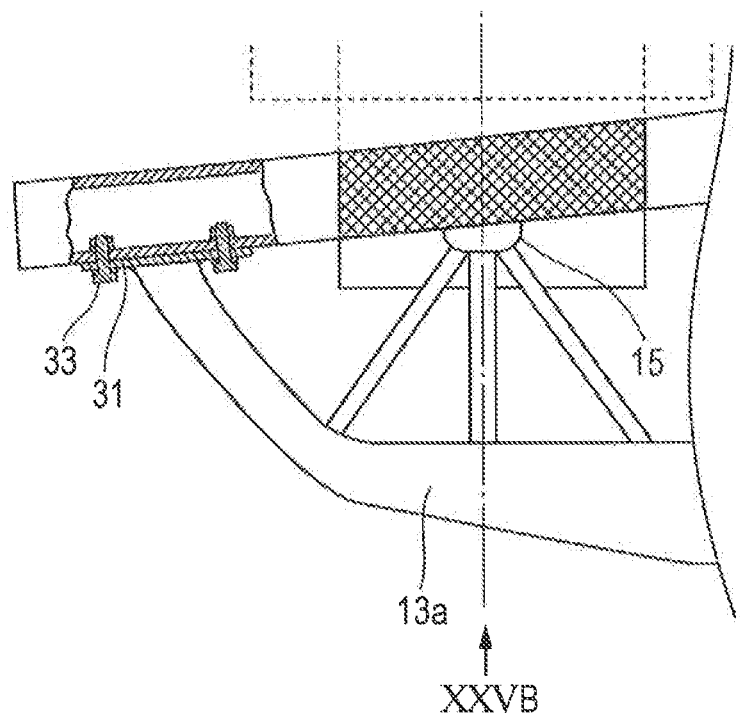
FIG. 25A is a plan view similar to FIG. 21A, illustrating a fifteenth implementation of the invention.
Figure 25B:
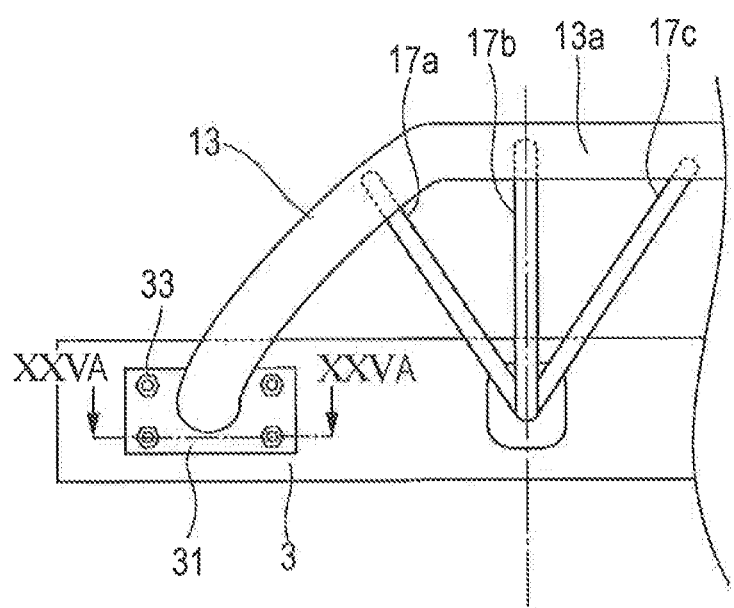
FIG. 25B is a side elevation view looked from an arrow XXVB in FIG. 25A.

FIG. 25A is a plan view similar to FIG. 21A, illustrating a fifteenth implementation of the invention. FIG. 25B is a side elevation view looked from an arrow XXVB in FIG. 25A. A broken part in FIG. 25A is a cross sectional view taken along a line XXVA-XXVA in FIG. 25B.

In the fifteenth implementation, as illustrated FIG. 25A, the connecting portion 31 cannot pivot on the main frame 3 by a plurality of bolt-nut units 33 without breaking the bolt-nut units 33. However, if a strength of the bolt-nut units 33 against a shearing force is suitably selected, the bolt-nut units 33 can be sheared on a contact surface between the connecting portion 31 and the main frame 3. This will enable the designer to design a force against a pivotal motion. Also, by selecting a structure (a shape and a welding amount) of a portion between the connecting portion 31 and the upper frame 3, it is possible to design any reaction force against the pivotal motion. As described above, it is possible for a designer to design a motor vehicle that has a lower damage value by exerting any amount of the reaction force.

It is preferable in the fifteenth implementation that the connecting portion 31 is provided on any part from the distal end of the vehicle body to the radiator 71, as is the case with the fourteenth implementation.

The invention claimed is:

1. A vehicle body structure comprising:
   a passenger cabin;
   a main frame;
   an upper frame disposed in an upward direction and an outward direction of the main frame; and
   a reinforcing unit different and separated from an upper suspension holder for supporting an upper part of a suspension, wherein
   a distal end of the upper frame in a frontward direction is connected with the main frame at a position between a distal end of the vehicle body structure in the frontward direction and a radiator panel, and
   the reinforcing unit is joined to the main frame at a location to oppose an outward surface of an engine, in a widthwise direction of the vehicle body structure.

2. The vehicle body structure according to claim 1, wherein
   the main frame has a reinforced portion having a strength which is higher than that of the other portions of the main frame;
   the reinforcing unit bridges between the upper frame and the reinforced portion; and
   the reinforced portion is positioned in frontward and backward directions and upward and downward directions to oppose an outward side surface of an engine mounted by an engine mount that is supported on the main frame.

3. The vehicle body structure according to claim 1, further comprising
   a suspension cross member connected with the main frame and supporting an engine, wherein
   the main frame includes a reinforced portion having a strength which is higher than that of the other portions of the main frame at least by connecting the suspension cross member with the main frame; and
   the reinforcing unit bridges between the upper frame and the reinforced portion.

4. The vehicle body structure according to claim 1, further comprising:
   a suspension cross member for supporting an engine; and
   a main frame bracket unit connected with the main frame for interconnecting the main frame and the suspension cross member;

wherein the reinforcing unit bridges between the upper frame and the main frame bracket unit.

5. The vehicle body structure according to claim 1, wherein the reinforcing unit bridges between the upper frame and the main frame.

6. The vehicle body structure according to claim 1, wherein
the reinforcing unit connects the upper frame and the main frame, with an end of the reinforcing unit being connected to an inward side surface of the upper frame.

7. The vehicle body structure according to claim 1, wherein
the upper frame comprises a straight portion that extends forward in the frontward direction of the vehicle body structure, and a curved portion that extends from a front of the straight portion and inward and downward in the frontward direction of the vehicle body structure; and
the reinforcing unit comprises a plurality of reinforcing members that extend between the main frame and the upper frame, with at least one of the plurality of reinforcing members connected to the straight portion of the upper frame and at least one of the plurality of reinforcing members connected to the curved portion of the upper frame.

8. The vehicle body structure according to claim 1, further comprising:
a suspension cross member that extends in a width direction of the vehicle body structure to bridge two main frames;
wherein the reinforcing unit connects the upper frame and one of the two main frames, and the reinforcing unit and the suspension cross member are connected to a main frame at a common location in a length direction of the vehicle body structure.

9. The vehicle body structure according to claim 1, wherein
the passenger cabin extends rearward, in a lengthwise direction of the vehicle body structure, relative to the main frame and the upper frame; and extends laterally, in a widthwise direction of the vehicle body structure, sufficiently to accommodate at least two passengers sitting laterally from one another.

10. A vehicle body structure comprising:
a passenger cabin;
a main frame;
an upper frame disposed in an upward direction and an outward direction with respect to the main frame;
an engine;
an upper suspension holder for supporting an upper part of a suspension; and
a reinforcing unit different from the upper suspension holder, wherein
the reinforcing unit extends in a frontward direction from a frontward surface of the upper suspension holder and interconnects the upper frame and the upper suspension holder;
the upper suspension holder connects with the upper part of the suspension at a position in frontward and backward directions and upward and downward directions so as to oppose an outward side surface of the engine;
a distal end of the upper frame in a frontward direction is connected with the main frame at a position between a distal end of a vehicle body in the frontward direction and a radiator panel;
the upper frame comprises a horizontal straight portion that extends horizontally forward in the frontward direction of the vehicle both structure, and a curved portion that extends from a front of the straight portion and inward and downward in the frontward direction of the vehicle body structure; and
the reinforcing unit comprises a plurality of reinforcing members that extend between the main frame and the upper frame, with at least one of the plurality of reinforcing members connected to the horizontal straight portion of the upper frame and at least one of the plurality of reinforcing members connected to the curved portion of the upper frame.

11. The vehicle body structure according to claim 10, further comprising a reinforced portion for reinforcing the upper suspension holder, wherein
the reinforcing unit bridges between the upper frame and the reinforced portion; and
the reinforced portion is positioned in the frontward and the backward directions and the upward and downward directions to oppose an outward side surface of the engine, in a vehicle widthwise direction.

12. The vehicle body structure according to claim 10, wherein
the passenger cabin extends rearward, in a lengthwise direction of the vehicle body structure, relative to the main frame and the upper frame; and extends laterally, in a widthwise direction of the vehicle body structure, sufficiently to accommodate at least two passengers sitting laterally from one another.

13. A vehicle body structure comprising:
a passenger cabin;
a main frame; and
an upper frame disposed in an upward direction and an outward direction with respect to the main frame, wherein
a frontward side of the upper frame is curved in an inward direction and a downward direction;
a distal end of the upper frame in a frontward direction is connected with the main frame at a position between a distal end of the vehicle body structure in the frontward direction and a radiator panel, the connection between the distal end of the upper frame and the main frame being such that the upper frame and the main frame are adapted to pivot in relation to each other about an axis extending in the inward and outward directions when a crash force is applied against the upper frame in a lengthwise direction of the vehicle body structure.

14. The vehicle body structure according to claim 13, further comprising:
a reinforcing unit that connects the upper frame and the main frame, with an end of the reinforcing unit being connected to an inward side surface of the upper frame.

15. The vehicle body structure according to claim 13, wherein
the upper frame comprises a straight portion that extends forward in the frontward direction of the vehicle body structure, and a curved portion that extends from a front of the straight portion and inward and downward in the frontward direction of the vehicle body structure; and
the vehicle body structure further comprises a reinforcing unit that comprises a plurality of reinforcing members that extend between the main frame and the upper frame, with at least one of the plurality of reinforcing members connected to the straight portion of the upper frame and at least one of the plurality of reinforcing members connected to the curved portion of the upper frame.

16. The vehicle body structure according to claim 13, further comprising:

a suspension cross member that extends in a width direction of the vehicle body structure to bridge two main frames; and a reinforcing unit that connects the upper frame and one of the two main frames, wherein the reinforcing unit and the suspension cross member are connected to a main frame at a common location in a length direction of the vehicle body structure.

17. A vehicle body structure comprising:

a passenger cabin;

a main frame; and an upper frame disposed in an upward direction and an outward direction with respect to the main frame, wherein a frontward portion of the upper frame that extends toward a distal end of the upper frame is curved in an inward direction and a downward direction, and the distal end of the upper frame toward which the curved frontward portion extends is connected with the main frame at a position between a distal end of the vehicle body structure in the frontward direction and a position of a radiator panel, the connection between the distal end of the upper frame and the main frame being on an upward side surface of the main frame.

18. The vehicle body structure according to claim 17, further comprising a reinforcing unit that connects the upper frame and the main frame, with an end of the reinforcing unit being connected to an inward side surface of the upper frame.

19. The vehicle body structure according to claim 17, wherein the upper frame comprises a straight portion that extends forward in the frontward direction of the vehicle body structure, and a curved portion that extends from a front of the straight portion and inward and downward in the frontward direction of the vehicle body structure; and the vehicle body structure further comprises a reinforcing unit that comprises a plurality of reinforcing members that extend between the main frame and the upper frame, with at least one of the plurality of reinforcing members connected to the straight portion of the upper frame and at least one of the plurality of reinforcing members connected to the curved portion of the upper frame.

20. The vehicle body structure according to claim 17, further comprising:

a suspension cross member that extends in a width direction of the vehicle body structure to bridge two main frames; and a reinforcing unit that connects the upper frame and one of the two main frames, wherein the reinforcing unit and the suspension cross member are connected to a main frame at a common location in a length direction of the vehicle body structure.

* * * * *